US012225469B2

(12) United States Patent
Shafin et al.

(10) Patent No.: US 12,225,469 B2
(45) Date of Patent: Feb. 11, 2025

(54) PEER-TO-PEER COMMUNICATION WITH NON-SIMULTANEOUS TRANSMIT AND RECEIVE OPERATION

(71) Applicant: Samsung Electronics Co., Ltd., Suwon-si (KR)

(72) Inventors: Rubayet Shafin, Allen, TX (US); Boon Loong Ng, Plano, TX (US); Peshal Nayak, Plano, TX (US); Shiyang Leng, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 329 days.

(21) Appl. No.: 17/834,848

(22) Filed: Jun. 7, 2022

(65) Prior Publication Data
US 2022/0408367 A1 Dec. 22, 2022

Related U.S. Application Data

(60) Provisional application No. 63/341,326, filed on May 12, 2022, provisional application No. 63/331,136, (Continued)

(51) Int. Cl.
*H04W 76/14* (2018.01)
*H04W 52/02* (2009.01)
*H04W 76/15* (2018.01)
(52) U.S. Cl.
CPC ....... *H04W 52/0258* (2013.01); *H04W 76/14* (2018.02); *H04W 76/15* (2018.02)
(58) Field of Classification Search
CPC .................................................. H04W 76/14
(Continued)

(56) References Cited

U.S. PATENT DOCUMENTS

| 2021/0007168 A1 | 1/2021 | Asterjadhi et al. |
| 2022/0141785 A1 | 5/2022 | Gan et al. |
| 2022/0408506 A1 | 12/2022 | Kim et al. |

FOREIGN PATENT DOCUMENTS

| WO | 2021008502 A1 | 1/2021 |
| WO | 2021011427 A1 | 1/2021 |
| WO | 2021085948 A1 | 5/2021 |

OTHER PUBLICATIONS

Extended European Search Report issued Apr. 30, 2024 regarding Application No. 22828680.3, 12 pages.

(Continued)

*Primary Examiner* — Angel T Brockman

(57) ABSTRACT

Methods and apparatuses for facilitating notification of an impending TDLS transmission in a wireless local area network. The apparatuses include a non-access point (AP) multi-link device (MLD) comprising stations (STAs) and a processor. Each STA comprises a transceiver configured to transceive signals on multi-link operation (MLO) links with APs of an AP MLD and on tunneled direct link setup (TDLS) direct links between the STAs and peer STAs of a second non-AP MLD, and to transmit, to the AP MLD on one of the MLO links, a TDLS transmission notification message. The processor is configured to determine that a TDLS transmission is impending over one of the TDLS direct links from one of the STAs that forms a non-simultaneous transmit/receive (NSTR) link pair with another STA, and to generate the TDLS transmission notification message, which includes an indication that the TDLS transmission is impending.

20 Claims, 13 Drawing Sheets

Related U.S. Application Data filed on Apr. 14, 2022, provisional application No. 63/327,668, filed on Apr. 5, 2022, provisional application No. 63/213,018, filed on Jun. 21, 2021.

(58) Field of Classification Search
USPC .......................................................... 370/329
See application file for complete search history.

(56) References Cited

OTHER PUBLICATIONS

"Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT)", IEEE P802.11be™/D1.0, May 2021, 635 pages.

"IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 7: Extensions to Direct-Link Setup (DLS)", IEEE Std 802.11z™-2010, Oct. 2010, 96 pages.

Patil et al., "Resolution for CIDs related to TDLS (CC34)", IEEE 802.11-21/00240r6, Apr. 2021, 7 pages.

IEEE Standards Association; IEEE Std 802.11—2020; IEEE Standard for Information Technology—Telecommunications and Information Exchange between Systems—Local and Metropolitan Area Networks—Specific Requirements; "Part 11: Wireless LAN Medium Access Control (MAC) and Physical Layer (PHY) Specifications"; Dec. 3, 2020; 4379 pgs.

LAN/MAN Standards Committee of the IEEE Computer Society; IEEE P802.11be/D1.01; Draft Standard for Information technology—Telecommunications and information exchange between systems Local and metropolitan area networks—Specific requirements; "Part 11: Wireless LAN Medium Access Control (MAC) and Physical Layer (PHY) Specifications"; Amendment 8: Enhancements for extremely high throughput (EHT); Jun. 2021; 657 pgs.

LAN/MAN Standards Committee of the IEEE Computer Society; IEEE P802.11ax/D8.0; Draft Standard for Information technology—Telecommunications and information exchange between systems Local and metropolitan area networks—Specific requirements; "Part 11: Wireless LAN Medium Access Control (MAC) and Physical Layer (PHY) Specifications"; "Amendment 1: Enhancements for High Efficiency WLAN"; Oct. 2020; 820 pgs.

Ming Gan, et al.; IEEE 802.11-19/1988-03-00be; "Power Save for Multi-link"; Nov. 11, 2019; 15 pgs.

IEEE 802.11-21/00240r6, "Resolution for CIDs Related to TDLS (CC34)", Mar. 2021, 7 pgs.

International Search Report and Written Opinion issued Sep. 21, 2022 regarding International Application No. PCT/KR2022/008663, 6 pages.

Patil et al., "Resolution for CIDs related to TDLS (CC34)", doc.:IEEE 802.11-21/00240r2, Mar. 2021, 9 pages.

PEER-TO-PEER COMMUNICATION WITH NON-SIMULTANEOUS TRANSMIT AND RECEIVE OPERATION

CROSS-REFERENCE TO RELATED APPLICATION(S) AND CLAIM OF PRIORITY

This application claims priority under 35 U.S.C. § 119(e) to U.S. Provisional Patent Application No. 63/213,018 filed on Jun. 21, 2021, U.S. Provisional Patent Application No. 63/327,668 filed on Apr. 5, 2022, U.S. Provisional Patent Application No. 63/331,136 filed on Apr. 14, 2022, and U.S. Provisional Patent Application No. 63/341,326 filed May 12, 2022, which are hereby incorporated by reference in their entirety.

TECHNICAL FIELD

This disclosure relates generally to simultaneous operation of peer-to-peer links and non-simultaneous transmit and receive links in wireless communications systems that include multi-link devices. Embodiments of this disclosure relate to methods and apparatuses for facilitating harmonious operation of tunneled direct link setup links and non-simultaneous transmit and receive link pairs in stations of multi-link devices in a wireless local area network communications system.

BACKGROUND

Wireless local area network (WLAN) technology allows devices to access the internet in the 2.4 GHz, 5 GHz, 6 GHz or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Multi-link operation (MLO) is a key feature for next generation extremely high throughput (EHT) WI-FI systems, e.g., IEEE 802.11be. The WI-FI devices that support MLO are referred to as multi-link devices (MLDs). With MLO, it is possible for a non-access point (non-AP) MLD to discover, authenticate, associate, and set up multiple links with an AP MLD. Channel access and frame exchange is possible on each link that is set up between the AP MLD and non-AP MLD.

MLO has two variations. The first type is simultaneous transmit/receive (STR) where the STAs affiliated with an MLD can transmit and receive independent of each other. The second variation is non-simultaneous transmit/receive (NSTR) in which the links formed by the STAs affiliated with an MLD do not form an STR link pair. If a link pair constitutes an NSTR link pair, transmission on one link can cause interference to the other link due to signal leakiness which the device's radio transceiver is unable to withstand. Consequently, two STAs forming an NSTR link pair cannot simultaneously transmit and receive frames. Since the STR mode of operation requires two or more radios with sufficient isolation, it is expected that AP MLDs will have STR capabilities while non-AP MLDs are more likely not to be capable of STR, and thus use NSTR.

Tunneled Direct Link Setup (TDLS) is a key feature for peer-to-peer communication between two non-AP stations (STAs) affiliated with a non-AP MLD. Harmonious operation between TDLS and NSTR in a non-AP MLD is important in order to realize the potential of multi-link devices in next generation WI-FI systems (e.g., IEEE 802.11be).

Target Wake Time (TWT) is one of the important features of the IEEE 802.11ax amendment. TWT enables wake time negotiation between an access point (AP) and an associated station (STA) for improving power efficiency. With TWT operation, it suffices for a STA to only wake up at pre-scheduled time negotiated with another STA or AP in the network. In IEEE 802.11ax standards, two types of TWT operation are possible—individual TWT operation and broadcast TWT operation. Individual TWT agreements can be established between two STAs or between a STA and an AP. On the other hand, with broadcast TWT (bTWT) operation, an AP can set up a shared TWT session for a group of STAs.

The negotiated parameters such as the wake interval, wake duration and initial wake time (offset) highly affect latency, throughput as well as power efficiency, which are directly related to QoS (quality of service) or customer experiences. Services with different traffic characteristics will have different TWT parameter configurations for better QoS. Additionally, the TWT configuration should adapt to network and service status variation.

TWT allows the non-AP STAs to wake up at designated time only, and thereby reduce power consumption. Some applications (e.g., cloud gaming, AR glasses) can have periodic burst traffic with very strict latency requirements. In setting up TWT by a non-AP STA, the STA may not have the traffic delay information at the AP (i.e., arrival time of downlink traffic). It may lead to large delay between the DL traffic arrival time and TWT service period (SP) start time. This may severely affect latency-sensitive applications. If the non-AP STA has information on the traffic delay at the AP, it can accordingly adjust its TWT parameters and hence can better support TWT traffic.

SUMMARY

Embodiments of the present disclosure provide methods and apparatuses for facilitating notifying an AP MLD of an impending TDLS transmission between non-AP MLDs in a wireless local area network.

In one embodiment, a non-AP MLD is provided, comprising a plurality of stations (STAs) and a processor. Each STA comprises a transceiver configured to transmit or receive first signals on multi-link operation (MLO) links between the STAs and corresponding APs of an AP MLD, respectively, and to transmit or receive second signals on tunneled direct link setup (TDLS) direct links between the STAs and other peer STAs or corresponding peer STAs of a second non-AP MLD, respectively. At least two of the STAs form a non-simultaneous transmit/receive (NSTR) link pair. The processor is operably coupled to the transceivers, and configured to determine that a TDLS transmission is impending over one of the TDLS direct links from one of the STAs that forms the NSTR link pair and to generate a TDLS transmission notification message that includes an indication that the TDLS transmission is impending. The transceivers are further configured to transmit, to the AP MLD on one of the MLO links via a corresponding one of the STAs, the TDLS transmission notification message.

In another embodiment, an AP MLD is provided, comprising a plurality of APs and a processor. The APs each comprise a transceiver configured to transmit or receive signals on MLO links between the APs and corresponding STAs of first and second non-AP MLDs, respectively. A TDLS direct link is formed between a STA of the first non-AP MLD and another peer STA or corresponding peer STA of the second non-AP MLD. At least two of the STAs of the first non-AP MLD form an NSTR link pair. The transceivers are further configured to receive, from the non-AP MLD on one of the MLO links via a corresponding one of the APs, a TDLS transmission notification message that includes an indication that a TDLS transmission is impending over the TDLS direct link from one of the STAs of the first non-AP MLD that forms the NSTR link pair. The processor is coupled to the transceivers, and is configured to determine, based on the TDLS transmission notification message, that the TDLS transmission is impending over the TDLS direct link from the one of the STAs of the first non-AP MLD that forms the NSTR link pair.

In another embodiment, a method performed by a non-AP MLD is provided, including the steps of determining that a TDLS transmission is impending over a TDLS direct link from a STA of the non-AP MLD that forms an NSTR link pair with another STA of the non-AP MLD, wherein the TDLS direct link is formed between the STA of the non-AP MLD and another peer STA or corresponding peer STA of a second non-AP MLD, generating a TDLS transmission notification message that includes an indication that the TDLS transmission is impending, and transmitting, to an AP MLD on an MLO link via a corresponding one of the STAs, the TDLS transmission notification message, wherein MLO links are formed between APs of the AP MLD and corresponding STAs of the non-AP MLD.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The following documents and standards descriptions are hereby incorporated into the present disclosure as if fully set forth herein:

[1] IEEE 802.11-19/1988r3, "Power Save for Multi-link", June 2020.

[2] IEEE 802.11-21/240r6, "Resolution for CIDs Related to TDLS (CC34)", March 2021.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that whenever there is a peer-to-peer link (e.g., a TDLS link) between any pair of STAs affiliated with a pair of non-AP MLDs over one link, and if any of the non-AP MLDs is not STR capable over any of its links with an AP MLD, then any other NSTR links become essentially ineffective.

Accordingly, embodiments of the present disclosure provide apparatuses and methods that facilitate the AP MLD discovering the existence of the TDLS link between the pair of non-AP MLDs associated with the AP MLD, and avoiding the potential clash between the TDLS link operation and any other NSTR link operation.

Figure 1:
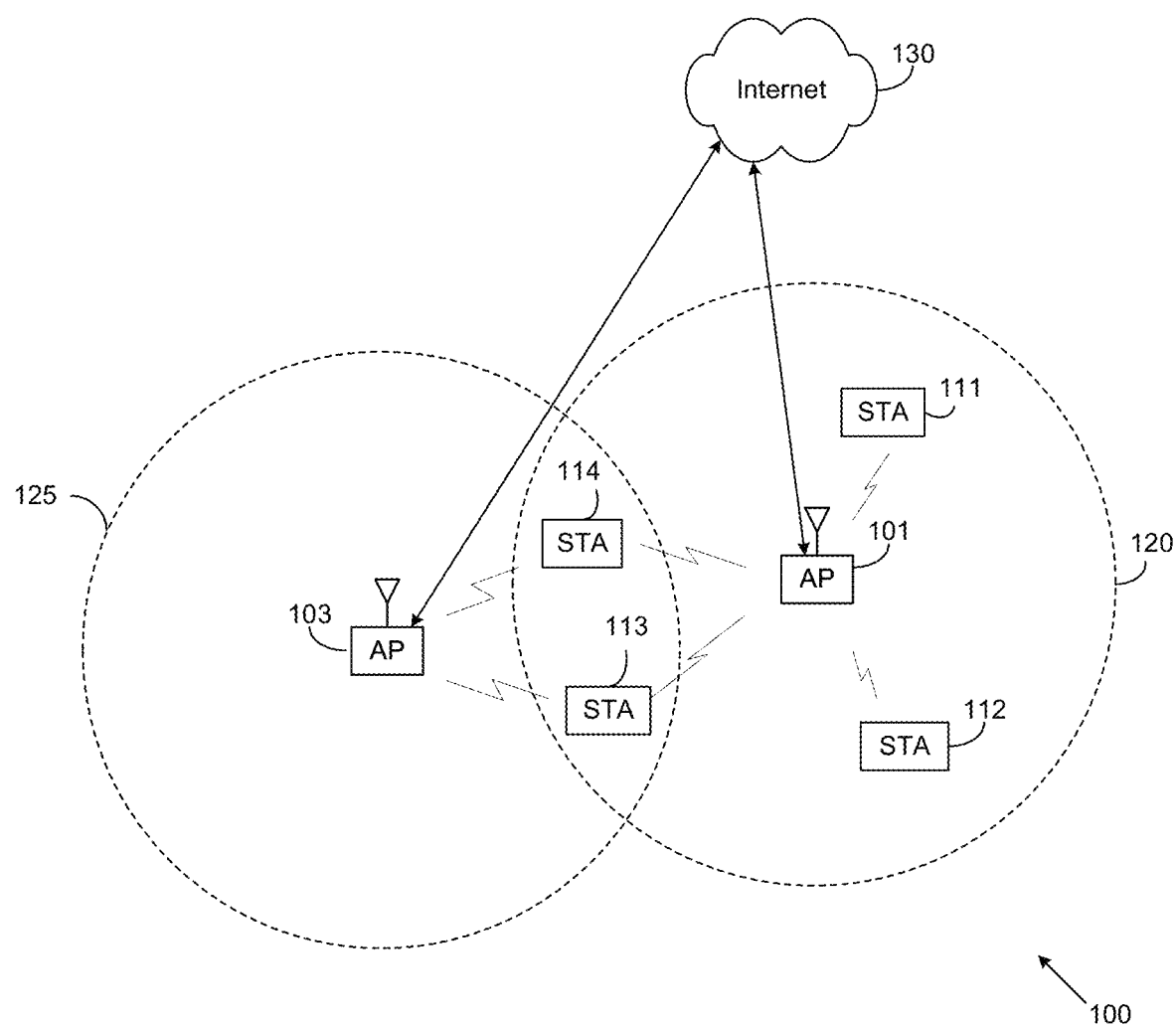
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating notifying an AP MLD of an impending TDLS transmission between non-AP MLDs in WLANs. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
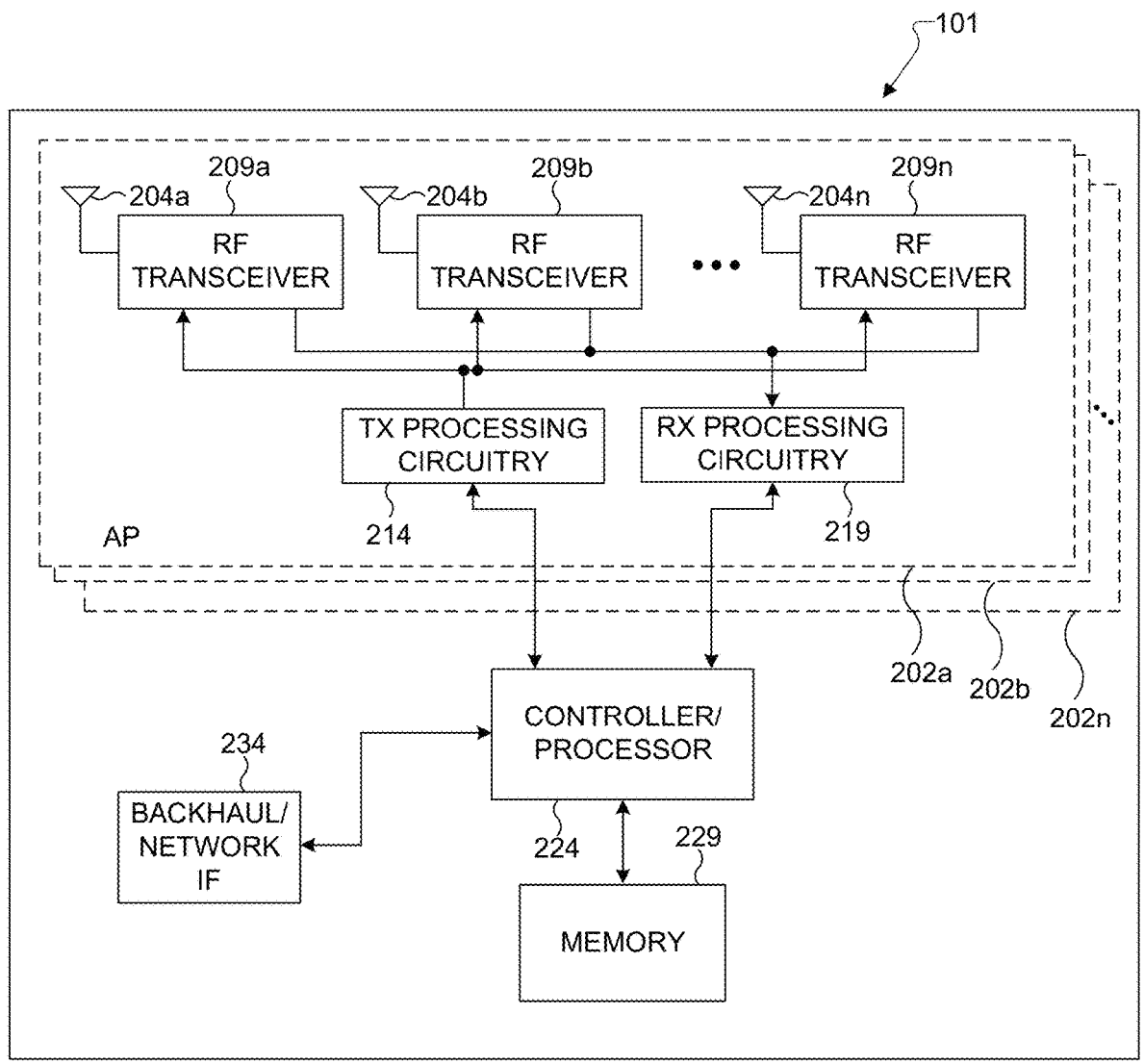
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn). Each of the affiliated APs 202a-202n includes multiple antennas 204a-204n, multiple RF transceivers 209a-209n, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth, e.g., 2.4 GHz, 5 GHz, or 6 GHz, and accordingly the incoming RF signals received by each affiliated AP may be at a different frequency of RF. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-convert the baseband or IF signals to RF signals that are transmitted via the antennas 204a-204n. In embodiments wherein each affiliated AP 202a-202n operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including facilitating notifying an AP MLD of an impending TDLS transmission between non-AP MLDs in WLANs. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for facilitating notifying an AP MLD of an impending TDLS transmission between non-AP MLDs in WLANs. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202a-202n is shown as including a single instance of TX processing circuitry 214 and a single instance of RX processing circuitry 219, the AP MLD 101 could include multiple instances of each (such as one per RF transceiver) in one or more of the affiliated APs 202a-202n. Alternatively, only one antenna and RF transceiver path may be included in one or more of the affiliated APs 202a-202n, such as in legacy APs. Also, various components in FIG. 2A could be combined, further subdivided, or omitted and additional components could be added according to particular needs.

Figure 2B:
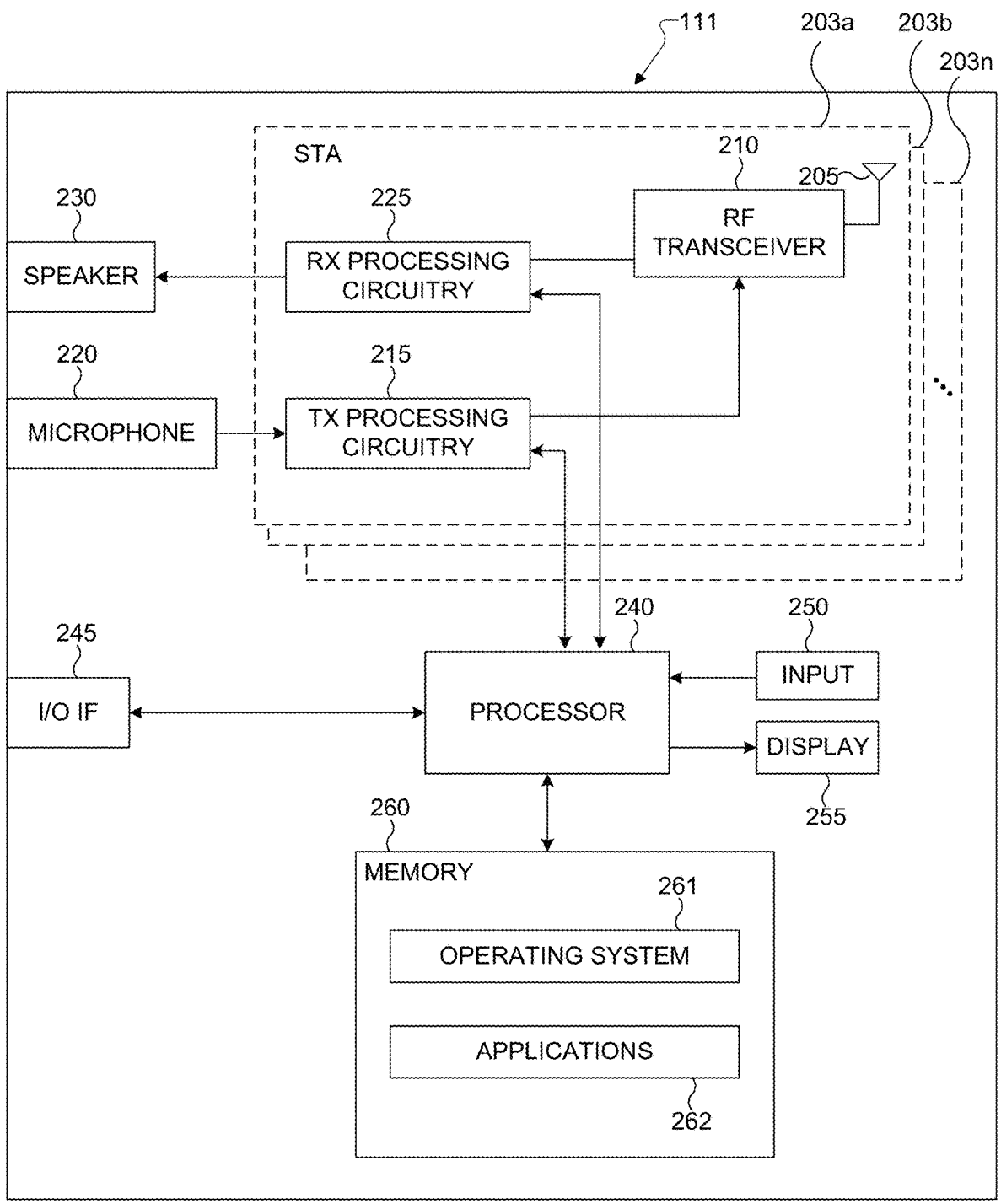
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203a-203n (which may be referred to, for example, as STA1-STAn). Each of the affiliated STAs 203a-203n includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203a-203n may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203a-203n.

For each affiliated STA 203a-203n, the RF transceiver 210 receives, from the antenna(s) 205, an incoming RF signal transmitted by an AP of the network 100. In some embodiments, each affiliated STA 203a-203n operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203a-203n, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203a-203n operates at a different bandwidth, e.g., 2.4 GHz, 5 GHz, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to provide facilitating notifying an AP MLD of an impending TDLS transmission between non-AP MLDs in WLANs. In some embodiments, the controller/processor 240 includes at least one microprocessor or microcontroller.

The controller/processor 240 is also capable of executing other processes and programs resident in the memory 260, such as operations for facilitating notifying an AP MLD of an impending TDLS transmission between non-AP MLDs in WLANs. The controller/processor 240 can move data into or out of the memory 260 as required by an executing process. In some embodiments, the controller/processor 240 is configured to execute a plurality of applications 262, such as applications for facilitating notifying an AP MLD of an impending TDLS transmission between non-AP MLDs in WLANs. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203a-203n may include any number of antenna(s) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

Figure 3A:
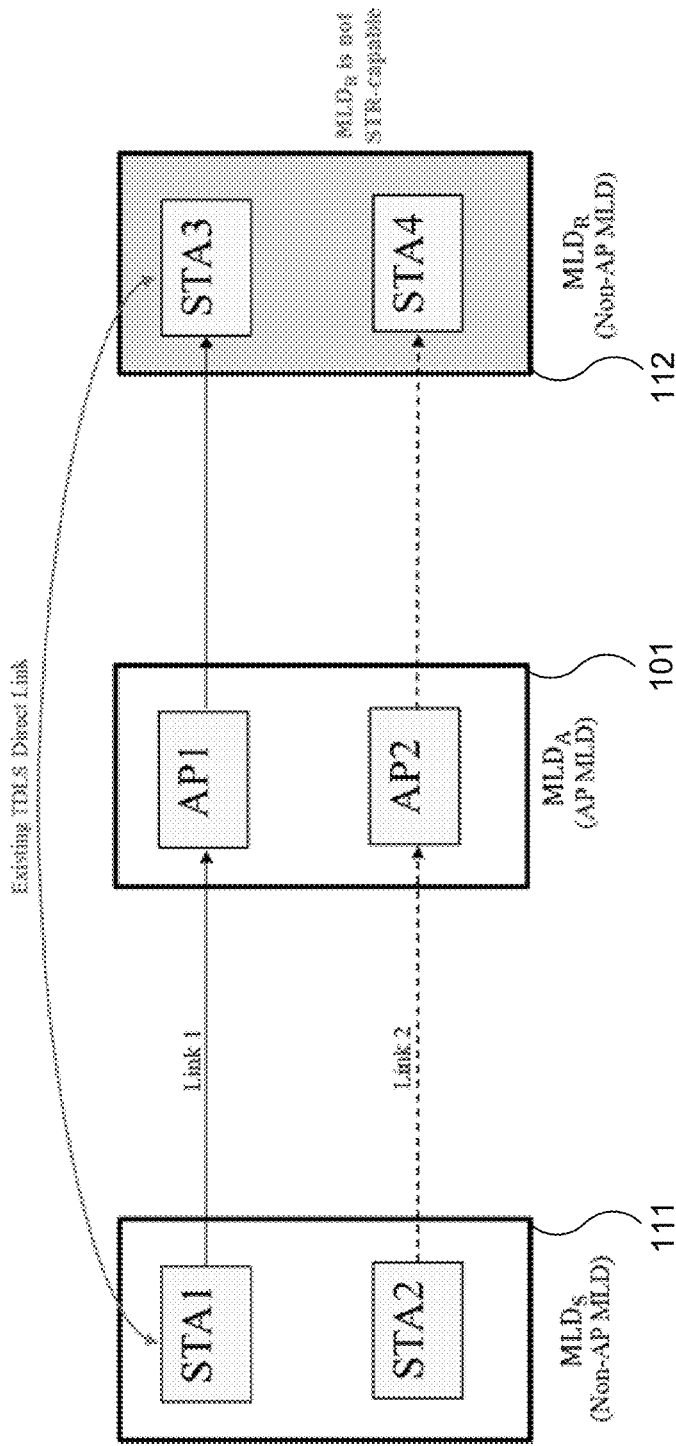
FIG. 3A illustrates an example scenario of conflict between NSTR links and a TDLS link according to embodiments of the present disclosure.

FIG. 3A illustrates an example scenario of conflict between NSTR links and a TDLS link according to embodiments of the present disclosure. For ease of explanation, the AP MLD 101 is illustrated with two affiliated APs and the non-AP MLDs 111 and 112 are illustrated with two affiliated non-AP STAs, but it is understood that this process could be applied with suitable MLDs having any number of affiliated APs or STAs.

In the embodiment of FIG. 3A, $MLD_S$ and $MLD_R$ are two non-AP MLDs (e.g., non-AP MLDs 111 and 112) and $MLD_A$ is an AP MLD (e.g., AP MLD 101). STA1 and STA2 are two non-AP STAs affiliated with the non-AP MLD, $MLD_S$. STA3 and STA4 are two non-AP STAs affiliated with non-AP MLD, $MLD_R$, which is not STR-capable. AP1 and AP2 are two APs affiliated with AP MLD, $MLD_A$.

Two ML links have been set up between $MLD_S$ and $MLD_A$—one between STA1 and AP1 over Link 1, and the other between STA2 and AP2 over Link 2. Additionally, two ML links have been set up between $MLD_R$ and $MLD_A$—one between STA3 and AP1 over Link 1, and the other between STA4 and AP2 over Link 2. STA3 and STA4—operating on Link 1 and Link 2, respectively—form an NSTR link pair.

Additionally, a TDLS link has been established between STA1 and STA3. When STA3 is communicating to STA1 over the TDLS direct link, the AP MLD ($MLD_A$) would typically not be aware of the communication over the TDLS link. $MLD_A$ is, however, aware of $MLD'_R$s NSTR restriction. Without knowledge of the TDLS link, as long as STA3 is not transmitting to AP1 over Link 1, AP2 is allowed to perform downlink transmission to STA4 over Link 2. However, if STA3 is transmitting to STA1 over the TDLS direct link, then STA4 would not be able to simultaneously receive packets from AP2 over Link 2 due to the NSTR restriction.

Figure 3B:
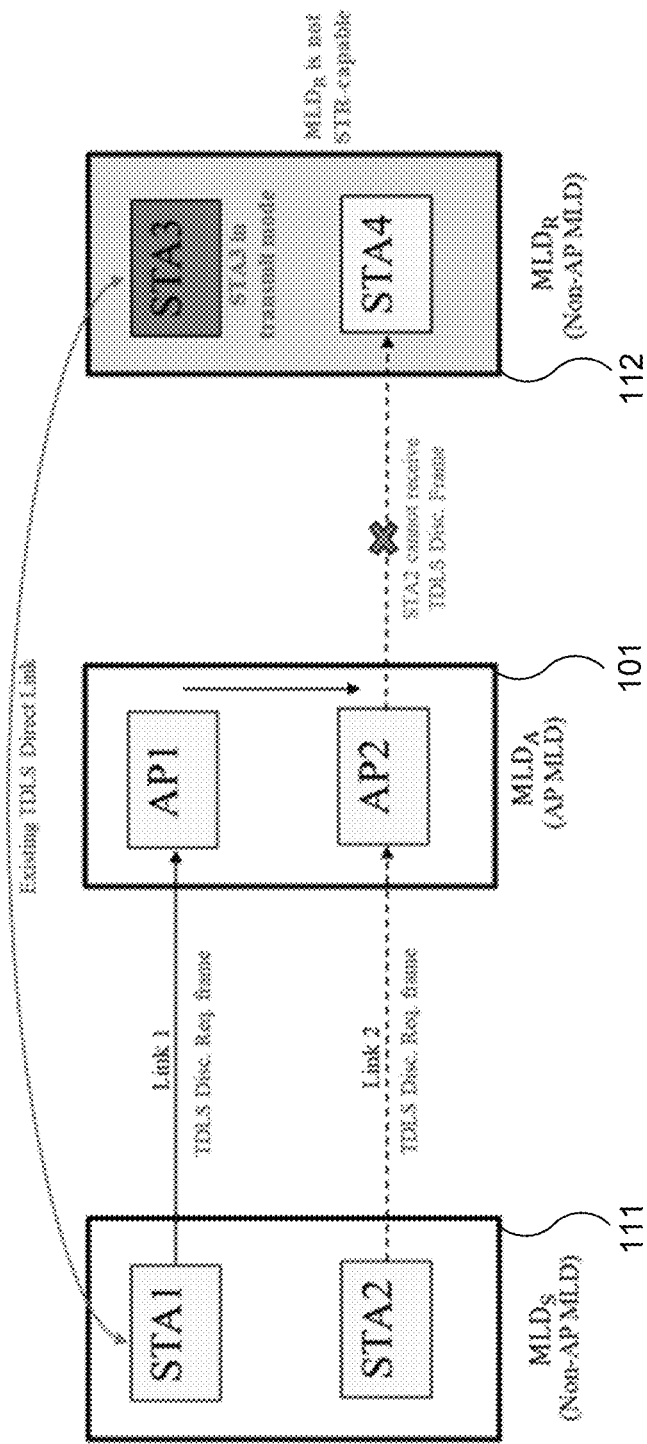
FIG. 3B illustrates an extension of the example scenario of FIG. 3A related to establishing a second TDLS link between the two non-AP MLDs.

FIG. 3B illustrates an extension of the example scenario of FIG. 3A related to establishing a second TDLS link between the two non-AP MLDs ($MLD_S$ and $MLD_R$). Reference [2] describes the procedure for setting up a single TDLS link between two non-AP MLDs. After setting up the first TDLS link (e.g., the existing TDLS link of FIG. 3A), the procedure in [2] cannot be followed for the establishing a second TDLS link between the two non-AP MLDs if any one of the TDLS peer STAs communicating over the existing TDLS direct link form an NSTR link pair in the associated non-AP MLD.

Referring again to FIG. 3A, according to one embodiment, the AP (AP1) affiliated with AP MLD ($MLD_A$), with which the TDLS peer STAs (STA1 and STA3) are associated, can monitor the wireless channel in order to know when a TDLS peer STA (STA3) that forms an NSTR link pair with one or more other STAs (STA4) in the same non-AP MLD with which the TDLS peer STA is affiliated ($MLD_R$) is in transmission mode. AP2 affiliated with $MLD_A$ can accordingly manage transmission to the other STA (STA4) forming the NSTR link pair so that the NSTR restriction is not violated.

In some embodiments, during the TDLS discovery and setup phase, STA1 and STA3 exchange frames through AP1. AP1 is therefore aware of the preamble/header of any frames exchanged between the TDLS peer STAs. Also, AP1 is aware of the MAC addresses of STA1 and STA3. By monitoring the channel using this knowledge, AP1 can know when there is a transmission happening over the TDLS direct link. Moreover, since AP1 knows the MAC addresses of the TDLS peer STAs, when there is a communication happening over the TDLS direct link, AP1 can know if STA3 is the transmitting STA or not. Upon monitoring the channel, if $MLD_A$ knows that STA3 is transmitting over the TDLS direct link, considering the NSTR capability of $MLD_R$, AP2 can pause any transmission to STA4 until STA3 finishes its transmission.

According to various embodiments, when there is a TDLS direct link set up between two TDLS peer STAs affiliated with two non-AP MLDs, if either of the TDLS peer STAs form one or more NSTR link pairs with other STAs affiliated with the same non-AP MLD with which the TDLS peer STA is affiliated, then the corresponding AP affiliated with AP MLD with which the other STA forming the NSTR link pair is associated does not transmit any frame to the other STA forming the NSTR link pair as long as the TDLS direct link is maintained. In reference to FIG. 3A, when the TDLS direct link has been set up between STA1 and STA3, AP2 would not transmit any frame to STA4 as long as the TDLS direct link between STA1 and STA3 is maintained.

In other embodiments, when there is a TDLS direct link set up between two TDLS peer STAs affiliated with two non-AP MLDs, if either of the TDLS peer STAs form one or more NSTR link pairs with other STAs affiliated with the same non-AP MLD with which the TDLS peer STA is affiliated, then if the TDLS direct link is torn down the TDLS peer STAs forming the NSTR link pairs would notify the corresponding AP affiliated with the AP MLD about this TDLS link tearing down event. In reference to FIG. 3A, if an existing TDLS direct link between STA1 and STA3 is torn down, STA3 would notify AP1 about this TDLS link tear down event, and AP2 can accordingly manage/resume its transmission to STA4. If the TDLS peer STA is unreachable, then the TDLS Teardown frame is sent through the associated AP affiliated with the AP MLD (i.e., with the reason code set to TDLS_PEER_UNREACHABLE), and accordingly the associated AP affiliated with the AP MLD is naturally notified about the TDLS teardown event.

According to some embodiments for tearing down an existing TDLS direct link, the TDLS Teardown frame is transmitted through the AP—even if the TDLS peer STA is not unreachable—if the TDLS teardown process is initiated by a TDLS peer STA affiliated with a non-AP MLD, where the TDLS peer STA forms one or more NSTR link pairs with other STAs affiliated with the same non-AP MLD with which the initiating TDLS peer STA is affiliated. In reference to FIG. 3A, if STA3 initiates tearing down the TDLS link with STA1, then according to this embodiment STA3 sends the TDLS Teardown frame through AP1.

According to some other embodiments, if a TDLS peer STA forms one or more NSTR link pairs with other STAs affiliated with the same non-AP MLD with which the TDLS peer STA is affiliated, and if the TDLS peer STA receives a TDLS Teardown frame over a TDLS direct link (e.g. with reason code other than TDLS_PEER_UNREACHABLE), then upon tearing the down the TDLS link, the TDLS peer STA sends a TDLS Teardown Notification frame to the associated AP affiliated with non-AP MLD. An example format for the TDLS Teardown Notification Action field is shown in Table 1.

TABLE 1

| Order | Information |
|---|---|
| 1 | Category |
| 2 | TDLS Action |
| 3 | Reason Code |
| 4 | FTE |
| 5 | Link Identifier |

The Category field, FTE field, and Link Identifier field of the TDLS Teardown Notification Action field can be set to the corresponding values in the TDLS Teardown frame that is used to tear down the TDLS direct link. The TDLS Action field of the TDLS Teardown Notification Action field can be set to 11 (TDLS Teardown Notification). Example TDLS Action field values are shown in Table 2. The Reason Code can be set as "NSTR_LINK_PAIR_FORMED".

TABLE 2

| TDLS Action field value | Meaning |
|---|---|
| 0 | TDLS Setup Request |
| 1 | TDLS Setup Response |
| 2 | TDLS Setup Confirm |
| 3 | TDLS Teardown |
| 4 | TDLS Peer Traffic Indication |
| 5 | TDLS Channel Switch Request |
| 6 | TDLS Channel Switch Response |
| 7 | TDLS Peer PSM Request |
| 8 | TDLS Peer PSM Response |
| 9 | TDLS Peer Traffic Response |
| 10 | TDLS Discovery Request |
| 11 | TDLS Teardown Notification |
| 12-255 | Reserved |

According to another embodiment, when there is a TDLS direct link set up between two TDLS peer STAs affiliated with two non-AP MLDs, if either of the TDLS peer STAs form one or more NSTR link pairs with other STAs affiliated with the same non-AP MLD with which the TDLS peer STA is affiliated, then the corresponding one or more APs affiliated with the AP MLD with which the other STAs forming the NSTR link pair are associated establish Target Wake Time (TWT) agreements/schedules with the other STAs affiliated with the non-AP MLD forming the NSTR link pairs. In this case, the TDLS peer STA that forms the NSTR link pair transmits over the TDLS direct link only when the other STAs affiliated with the same non-AP MLD and forming the NSTR link pairs are in the TWT doze state. In reference to FIG. 3A, when there is an existing TDLS direct link between STA1 and STA3, a TWT agreement/schedule is established between STA4 and AP2. According to this embodiment, STA3 may transmit to STA1 over the TDLS direct link only when STA4 is in the TWT doze state.

According to another embodiment, when there is a TDLS direct link set up between two TDLS peer STAs affiliated with two non-AP MLDs, if either of the TDLS peer STAs form one or more NSTR link pairs with other STAs affiliated with the same non-AP MLD with which the TDLS peer STA is affiliated, the corresponding APs affiliated with the AP MLD with which the other STAs forming the NSTR link pair is associated establish a WNM Sleep Mode schedule (or other power saving mechanism) with the other STAs affiliated with the non-AP MLD forming the NSTR link pairs. Then the TDLS peer STA that forms the NSTR link pairs transmits over the TDLS direct link only when the other STAs affiliated with the same non-AP MLD and forming the NSTR link pairs have entered into WNM Sleep mode (or into another sleep mode facilitated by another power saving mechanism), during which the other STAs are inactive. In reference to FIG. 3A, when there is an existing TDLS direct link between STA1 and STA3, a TWT agreement/schedule is established between STA4 and AP2. According to this embodiment, STA3 may transmit to STA1 over the TDLS direct link when STA4 is in WNM Sleep mode or another sleep state facilitated by another power saving mechanism, during which STA4 is inactive.

According to another embodiment, when there is a TDLS direct link set up between two TDLS peer STAs affiliated with two non-AP MLDs, if either of the TDLS peer STAs form one or more NSTR link pairs with other STAs affiliated with the same non-AP MLD with which the TDLS peer STA is affiliated, both the TDLS peer STA and the other STA affiliated with the same non-AP MLD with which the TDLS Peer STA is affiliated and forming the NSTR link pair enter into power saving mode. The TDLS peer STA that forms the NSTR link pair establishes the power saving mode with its peer TDLS STA using TDLS Peer PSM mode or TDLS Peer U-APSD mode. The other STA affiliated with the non-AP MLD that forms the NSTR link pair establishes the power saving mechanism (e.g. TWT, WNM Sleep Mode, U-APSD) with its associated AP affiliated with the AP MLD. The two power saving schedules are such that their awake state periods are non-overlapping. In reference to FIG. 3A, STA3 has a TDLS direct link set up with STA1. In order to accommodate the NSTR constraints of $MLD_R$, STA3 establishes a TDLS Peer PSM mode with STA1 as a power saving mechanism over the TDLS link. Moreover, STA4 establishes a TWT agreement with AP2. The parameters for the TDLS Peer PSM and the TWT agreement are chosen such that the TDLS Peer PSM service period and TWT service period are non-overlapping.

Figure 4:
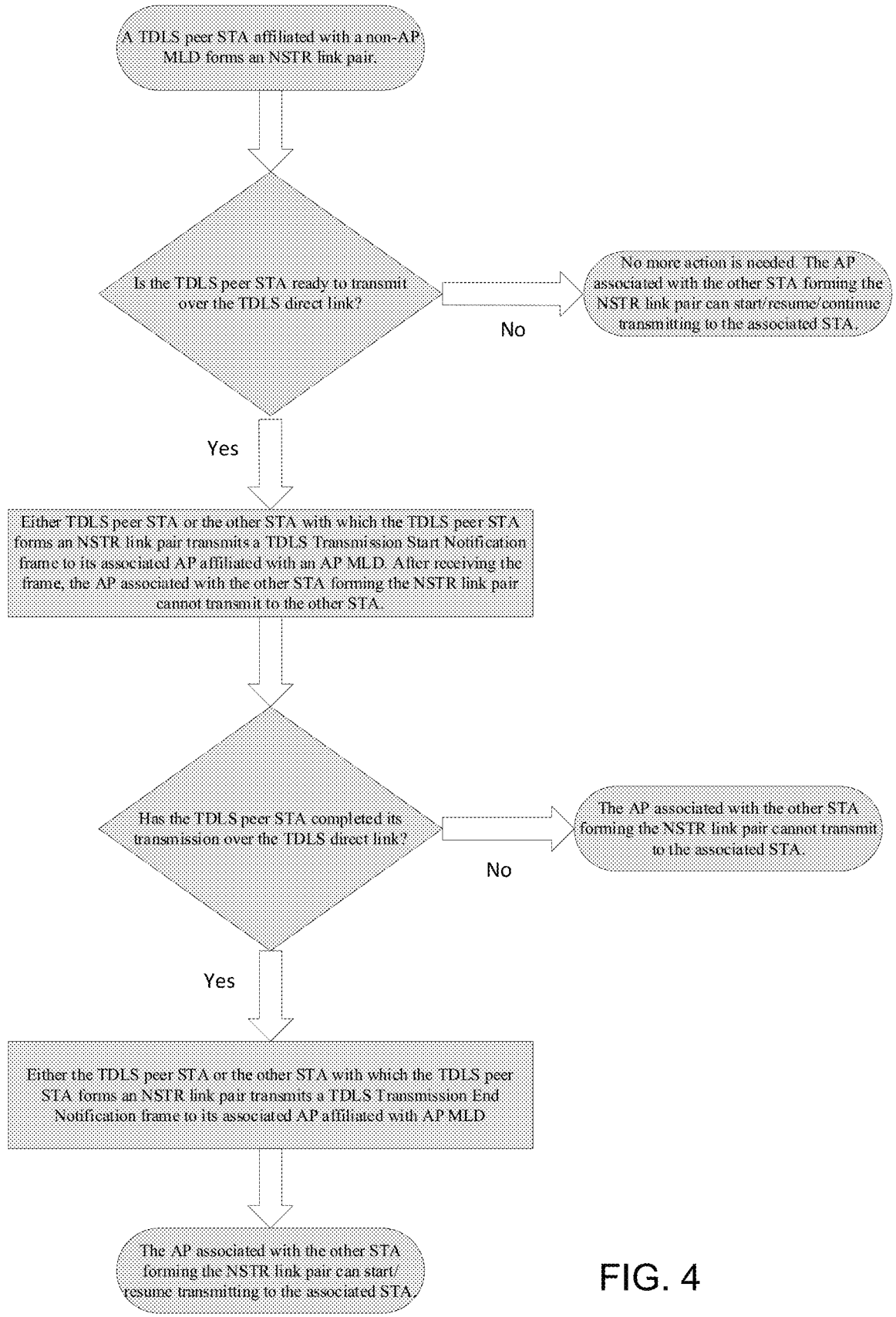
FIG. 4 illustrates an example process in which the TDLS peer STA notifies an AP affiliated with the AP MLD of an impending TDLS transmission using a TDLS Transmission Start Notification frame and of the end of the TDLS transmission using a TDLS Transmission End Notification frame according to an embodiment of the present disclosure.

According to another embodiment, when there is a TDLS direct link set up between two TDLS peer STAs affiliated with two non-AP MLDs, if either of the TDLS peer STAs form one or more NSTR link pairs with other STAs affiliated with the same non-AP MLD with which the TDLS peer STA is affiliated, the TDLS peer STA, before transmitting over the TDLS direct link, sends a TDLS Transmission Start Notification frame to the AP affiliated with the AP MLD with which the TDLS peer STA is affiliated. Once the TDLS peer STA completes its transmission over the TDLS direct link, it sends a TDLS Transmission End Notification frame to the AP affiliated with the AP MLD with which the TDLS peer STA is affiliated. Between the times of receiving the TDLS Transmission Start Notification frame and the TDLS Transmission End Notification frame by the associated AP affiliated with the AP MLD, the other APs affiliated with the AP MLD and associated with the other STAs affiliated with the non-AP MLD that have NSTR link pairs with the TDLS peer STA don't transmit to the associated STAs affiliated with the non-AP MLD. FIG. 4 illustrates an example process in which the TDLS peer STA notifies an AP affiliated with the AP MLD of an impending TDLS transmission using a TDLS Transmission Start Notification frame and of the end of the TDLS transmission using a TDLS Transmission End Notification frame according to this embodiment.

An example TDLS Transmission Start Notification action field is shown in Table 3, where the Category field, FTE field, and Link Identifier field can be set to the corresponding values from a TDLS Setup Confirm action field that has been used to confirm the setup of the TDLS direct link. The TDLS Action field is set to value 12 (TDLS Transmission Start Notification).

TABLE 3

| Order | Information |
|---|---|
| 1 | Category |
| 2 | TDLS Action |
| 3 | FTE |
| 4 | Link Identifier |

An example TDLS Transmission End Notification action field is shown in Table 4, where the Category field, FTE field, and Link Identifier field can be set to the corresponding values from a TDLS Setup Confirm action field that has been used to confirm the setup of the TDLS direct link. The TDLS Action field is set to value 13 (TDLS Transmission End Notification). The TDLS Action field values incorporating TDLS Transmission End Notification and TDLS Transmission Start Notification are shown in Table 5.

TABLE 4

| Order | Information |
|---|---|
| 1 | Category |
| 2 | TDLS Action |
| 3 | FTE |
| 4 | Link Identifier |

TABLE 5

| TDLS Action field value | Meaning |
|---|---|
| 0 | TDLS Setup Request |
| 1 | TDLS Setup Response |
| 2 | TDLS Setup Confirm |
| 3 | TDLS Teardown |

TABLE 5-continued

| TDLS Action field value | Meaning |
| --- | --- |
| 4 | TDLS Peer Traffic Indication |
| 5 | TDLS Channel Switch Request |
| 6 | TDLS Channel Switch Response |
| 7 | TDLS Peer PSM Request |
| 8 | TDLS Peer PSM Response |
| 9 | TDLS Peer Traffic Response |
| 10 | TDLS Discovery Request |
| 11 | Reserved |
| 12 | TDLS Transmission Start Notification |
| 13 | TDLS Transmission End Notification |
| 14-255 | Reserved |

According to some embodiments, in reference to FIG. 3A, if STA3 has some pending latency sensitive traffic for its TDLS peer STA (STA1), then the non-AP MLD ($MLD_R$) can send a notification frame (e.g. a TDLS Transmission Start Notification frame) to notify about the impending TDLS transmission by STA3 so that AP2 can terminate any ongoing downlink transmission to STA4 before the transmission starts over the TDLS direct link.

Another example format for the TDLS Transmission Start Notification Action field is shown in Table 6.

TABLE 6

| Order | Information | Notes |
| --- | --- | --- |
| 1 | Category | The Category field is defined in 9.4.1.11 (Action field). |
| 2 | TDLS Action | The TDLS Action field is defined in 9.6.12.1 (General). |
| 3 | Link Identifier | The Link Identifier element is specified in 9.4.2.61 (Link Identifier element). |

According to some embodiments, the TDLS Transmission Start Notification Action field is encapsulated in a Data frame and is transmitted through the AP MLD by an associated non-AP MLD to notify about an impending transmission by a TDLS peer STA, affiliated with the non-AP MLD, over the TDLS direct link. According to some other embodiments, this frame is transmitted over the TDLS direct link.

Another example format of the TDLS Transmission End Notification Action field is shown in Table 7.

TABLE 7

| Order | Information | Notes |
| --- | --- | --- |
| 1 | Category | The Category field is defined in 9.4.1.11 (Action field). |
| 2 | TDLS Action | The TDLS Action field is defined in 9.6.12.1 (General). |
| 3 | Link Identifier | The Link Identifier element is specified in 9.4.2.61 (Link Identifier element). |

According to some embodiments, the TDLS Transmission End Notification Action field is encapsulated in a Data frame and is transmitted through the AP MLD by an associated non-AP MLD to notify about the end of an ongoing transmission by a TDLS peer STA, affiliated with the non-AP MLD, over the TDLS direct link. According to some other embodiments, this frame is transmitted over the TDLS direct link.

According to some embodiments, the transmitter address (TA) of the TDLS Transmission Start Notification frame is the MAC address of the transmitting TDLS peer STA affiliated with the non-AP MLD. According to other embodiments, the TA of the TDLS Transmission Start Notification frame is the MAC address of the non-AP MLD with which the transmitting TDLS peer STA is affiliated.

According to some embodiments, the receiver address (RA) of the TDLS Transmission Start Notification frame is the MAC address of the AP affiliated with the AP MLD that is operating on the link that the transmitting TDLS peer STA is operating on. According to other embodiments, the RA of the TDLS Transmission Start Notification frame is the MAC address of the AP MLD with which the non-AP MLD, with which the transmitting TDLS peer STA is affiliated, is associated. According to some other embodiments, the RA of the TDLS Transmission Start Notification frame can be the MAC address of any AP affiliated with the AP MLD with which the recipient TDLS peer STA is affiliated.

According to some embodiments, the destination address (DA) of the TDLS Transmission Start Notification frame is the MAC address of the intended recipient TDLS peer STA at the other end of the TDLS direct link. According to some embodiments, the DA of the TDLS Transmission Start Notification frame is the MAC address of the non-AP MLD with which the intended recipient TDLS peer STA is affiliated.

According to some embodiments, the embodiments related to address rules described above are also applicable to the TDLS Transmission End Notification frame.

According to some embodiments, other Action frames (apart from TDLS action frames) can also be used for the purpose of sending a TDLS Transmission Start Notification frame and TDLS Transmission End Notification frame.

According to some embodiments, if a TDLS peer STA affiliated with a non-AP MLD forms one or more NSTR link pairs with other STAs affiliated with the same non-AP MLD, then before the TDLS peer STA starts transmitting over the TDLS direct link, the non-AP MLD, through any enabled link, sends a TDLS Transmission Start Notification frame to the intended recipient TDLS peer STA notifying about the impending transmission over the TDLS direct link identified by the Link Identifier element of the TDLS Transmission Start Notification frame. According to one embodiment, the TDLS Transmission Start Notification frame is transmitted through the AP and may not be transmitted to a group address.

According to one embodiment, upon reception of an Acknowledgement (ACK) frame from the AP MLD that corresponds to the TDLS Transmission Start Notification frame, the TDLS peer STA may start transmission over the TDLS direct link.

Once the TDLS peer STA ends its transmission over the TDLS direct link, the non-AP MLD, through any enabled link, sends a TDLS Transmission End Notification frame through the AP MLD notifying about the end of transmission over the TDLS direct link by the TDLS peer STA operating on the link identified by the Link Identifier element of the TDLS Transmission End Notification frame.

Figure 5A:
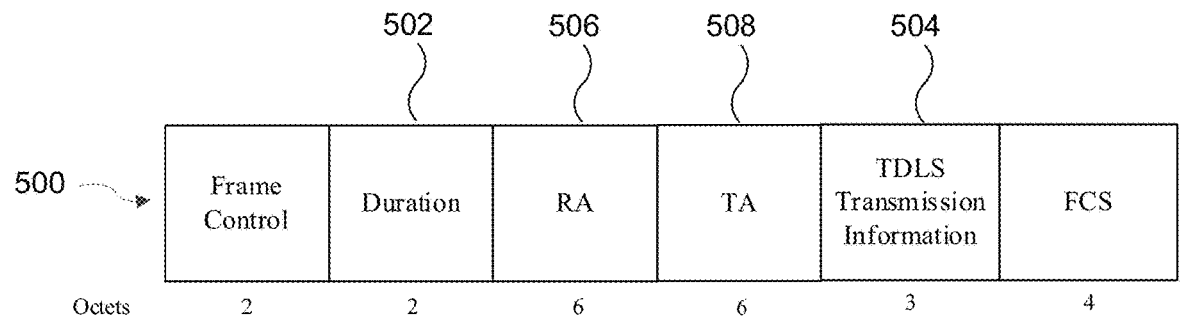
FIG. 5A illustrates an example frame format of the TDLS Transmission Notification frame, which is a control frame, according to various embodiments of the present disclosure.

FIG. 5A illustrates an example frame format of the TDLS Transmission Notification frame 500, which is a control frame, according to various embodiments of the present disclosure.

The Duration field 502 is set to the time until the start of transmission by a TDLS peer STA affiliated with a non-AP MLD over the TDLS direct link if a Transmission Start-End Indication subfield in the TDLS Transmission Information field 504 is set to 1. Otherwise, the Duration field 502 is set to the time until the end of an ongoing TDLS frame transmission. In other embodiments, the Duration field 502 is reserved if the Transmission Start-End Indication subfield in the TDLS Transmission Information field 504 is set to 0.

The RA field 506 is set to the MAC address of the intended receiver of the TDLS Transmission Notification frame. The TA field 508 is set to the MAC address of the transmitter of the TDLS Transmission Notification frame.

Figure 5B:
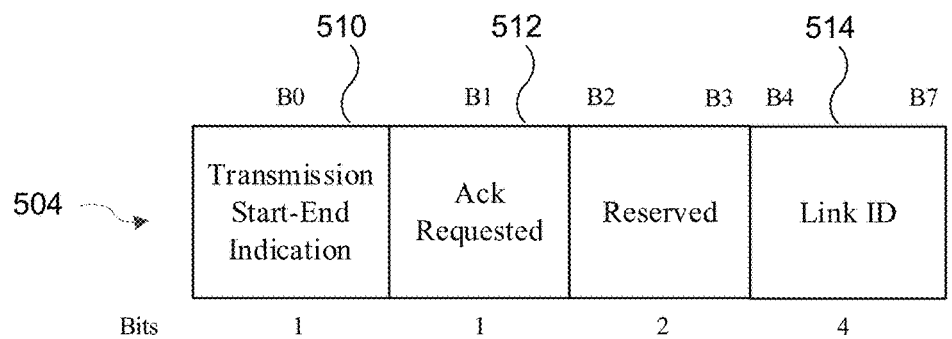
FIG. 5B illustrates an example subfield format of the TDLS Transmission Information field according to various embodiments of the present disclosure.

FIG. 5B illustrates an example subfield format of the TDLS Transmission Information field 504 according to various embodiments of the present disclosure.

The Transmission Start-End Indication subfield 510 indicates whether the TDLS Transmission Notification frame 500 indicates the start or end of a TDLS frame transmission. If the subfield is set to 1, then the TDLS Transmission Notification frame 500 indicates the start of an impending TDLS transmission by a TDLS peer STA affiliated with a non-AP MLD. If the subfield is set to 0, then the TDLS Transmission Notification frame indicates the end of an ongoing TDLS frame transmission by the STA affiliated with the non-AP MLD.

The Ack Requested subfield 512 is set to 1 if an acknowledgement is requested upon receipt of the TDLS Transmission Notification frame. Otherwise, the subfield is set to 0. The Link ID subfield 514 indicates the link on which a STA affiliated with a non-AP MLD is operating and is going to start or end its transmission over the TDLS direct link. Alternatively, a bitmap can also be used here to identify the links.

Figure 5C:
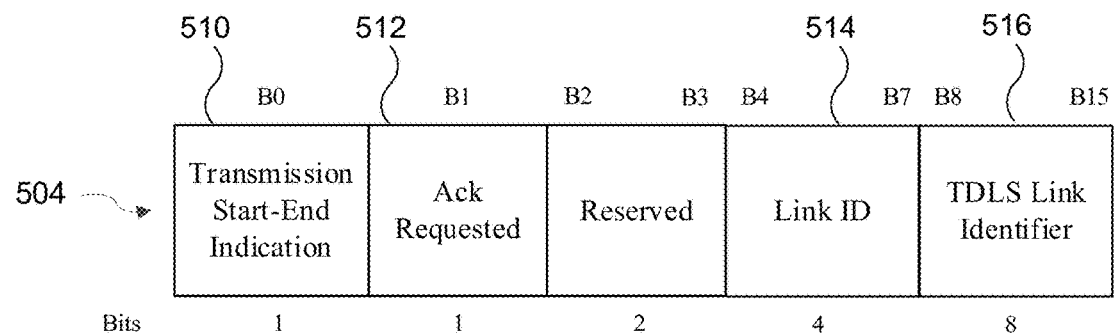
FIG. 5C illustrates an alternative example subfield format of the TDLS Transmission Information field according to various embodiments of the present disclosure.

FIG. 5C illustrates an alternative example subfield format of the TDLS Transmission Information field 504 according to various embodiments of the present disclosure. In this example, the TDLS Link Identifier subfield 516 identifies the TDLS peer STA (link) that is operating at the other end of the TDLS direct link on which the transmitting TDLS peer STA intends to start transmission.

According to one embodiment, upon observing the TDLS Link Identifier subfield 516 in the received TDLS Transmission Notification frame 500, the AP MLD may take necessary action to avoid NSTR interference at the non-AP MLD with which the recipient TDLS peer STA at the other of the TDLS link is affiliated, in the case in which the recipient peer STA also forms an NSTR link pair with another link between the AP MLD and the recipient non-AP MLD.

Figure 5D:
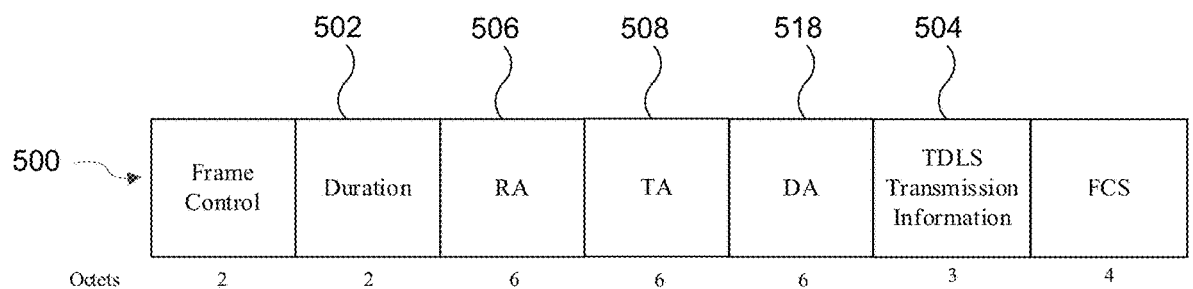
FIG. 5D illustrates an alternative example format of the TDLS Transmission Notification frame according to various embodiments of the present disclosure.

FIG. 5D illustrates an alternative example format of the TDLS Transmission Notification frame 500 according to various embodiments of the present disclosure. In this example, the TDLS Transmission Notification frame 500 includes a destination address (DA) field 518 that serves the purpose of the TDLS Link Identifier subfield 516. The DA field 518 includes the DA of the intended recipient peer STA for which the TDLS transmission is going to happen.

According to another embodiment, the DA field 518 identifies the TDLS peer STA which is the recipient of the frame transmission over the direct link by the STA or STA affiliated with the non-AP MLD that transmits the TDLS Transmission Notification frame 500. According to another embodiment, the DA of the TDLS Transmission Notification frame 500 can be contained in the TDLS Transmission Information field 504 of the TDLS Transmission Notification frame 500.

Figure 5E:
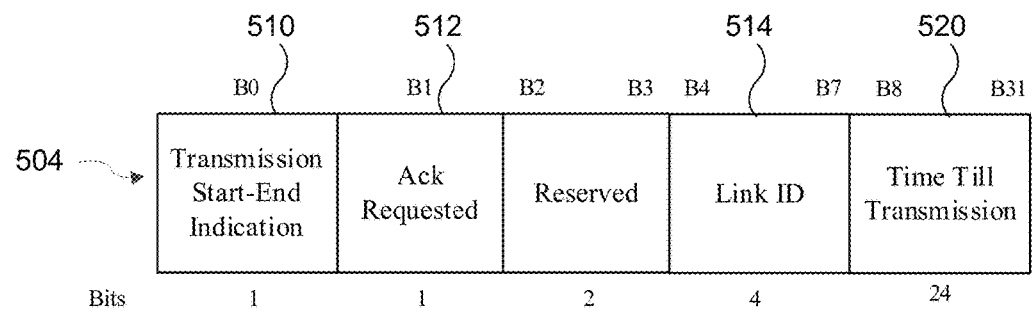
FIG. 5E illustrates another alternative example format of the TDLS Transmission Information field according to various embodiments of the present disclosure.

FIG. 5E illustrates another alternative example format of the TDLS Transmission Information field 504 according to various embodiments of the present disclosure.

According to one embodiment, the Time Till Transmission subfield 520 indicates the maximum amount of time before which the TDLS transmission must start over the TDLS direct link for which the TDLS Transmission Notification frame 500 was sent by the non-AP MLD. According to this embodiment, the TDLS transmission can start any time before this amount of time is elapsed.

According to another embodiment, the Time Till Transmission subfield 520 indicates the amount of time remaining until the TDLS transmission starts over the TDLS direct link. According to this embodiment, the TDLS transmission does not start before this time duration has elapsed. The Time Till Transmission subfield 520 may contain an unsigned integer in microseconds. Other units of time may also be used.

According to yet another embodiment, the Time Till Transmission subfield 520 indicates the time (i.e., the TSF time) at which the TDLS transmission will start. According to other embodiments, the TDLS Transmission Notification message could be an A-Control subfield rather than a control frame or TDLS action frame.

According to various embodiments, if a TDLS peer STA affiliated with a non-AP MLD forms one or more NSTR link pairs with other STAs affiliated with the same non-AP MLD, then before the TDLS peer STA starts transmitting over the TDLS direct link, the non-AP MLD, through any enabled link, sends a TDLS Transmission Notification frame with the Transmission Start-End Indication subfield set to 1 directly to the AP MLD notifying about the impending transmission over the TDLS direct link by the TDLS peer STA operating on the link identified by the Link ID subfield of the TDLS Transmission Notification frame.

According to one embodiment, upon receiving the TDLS Transmission Notification frame with the Transmission Start-End Indication subfield set to 1, the AP MLD sends a TDLS Transmission Acknowledgement frame to the non-AP MLD that sent the TDLS Transmission Notification frame. According to another embodiment, the TDLS Transmission Acknowledgement frame can be sent over any enabled link between the AP MLD and the non-AP MLD.

Figure 6:
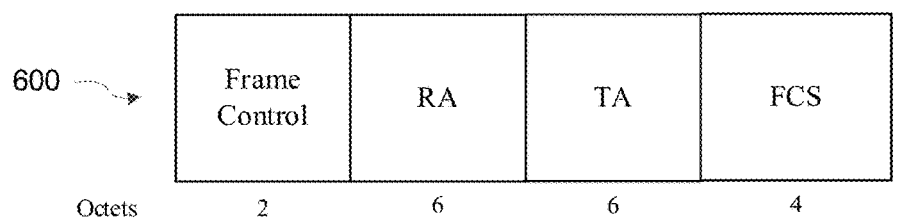
FIG. 6 illustrates an example format of a TDLS Transmission Acknowledgement frame according to various embodiments of the present disclosure.

FIG. 6 illustrates an example format of a TDLS Transmission Acknowledgement frame 600 according to various embodiments of the present disclosure. According to another embodiment, the TDLS Transmission Acknowledgement frame 600 may have a format that is similar to the format of the CTS or other control frame.

According to one embodiment, the AP MLD sends the TDLS Transmission Acknowledgement frame 600 to the non-AP MLD if the Ack Requested subfield 512 is set to 1 in the TDLS Transmission Notification frame 500 sent by the non-AP MLD to the AP MLD. Otherwise, the AP MLD doesn't send the TDLS Transmission Acknowledgement frame 600 to the non-AP MLD.

According to another embodiment, upon receiving the TDLS Transmission Notification frame 500 with the Transmission Start-End Indication subfield 510 set to 1, the AP MLD always sends that TDLS Transmission Acknowledgement frame 600 to that non-AP MLD.

According to another embodiment, upon receiving the TDLS Transmission Notification frame 500 with the Transmission Start-End Indication subfield 510 set to 1, the AP MLD sends the TDLS Transmission Acknowledgement frame 600 to the non-AP MLD if the Ack Requested subfield 512 in the TDLS Transmission Notification frame 500 is set to 1.

According to another embodiment, upon receiving the TDLS Transmission Notification frame 500 with the Transmission Start-End Indication subfield 510 set to 1, the AP MLD sends the TDLS Transmission Acknowledgement frame 600 to the non-AP MLD if the AP MLD allows/ permits the TDLS transmission over the direct link indicated in the TDLS Transmission Notification frame 500.

According to another embodiment, upon receiving the TDLS Transmission Notification frame 500 with the Transmission Start-End Indication subfield 510 set to 1, the AP MLD sends the TDLS Transmission Acknowledgement frame 600 to the non-AP MLD before the amount of time indicated in the Time Till Transmission subfield 520 of the TDLS Transmission Notification frame 500 has elapsed.

According to one embodiment, the TDLS Transmission Notification frame 500 or TDLS Transmission Acknowledgement frame 600 is sent over any enabled link between the AP MLD and the non-AP MLD. According to another embodiment, the TDLS Transmission Acknowledgement frame 600 is sent over the link on which the AP MLD receives the TDLS Transmission Notification frame 500 from the AP MLD.

Once the TDLS peer STA ends its transmission over the TDLS direct link, the non-AP MLD, through any enabled link, sends a TDLS Transmission Notification frame 500 with the Transmission Start-End Indication subfield 510 set to 0 to the AP MLD notifying about the end of the ongoing transmission over the TDLS direct link by the TDLS peer STA operating on the link identified by the Link ID subfield 514 of the TDLS Transmission Notification frame 500.

According to one embodiment, upon reception of the TDLS Transmission Notification frame 500, the AP MLD notifies the recipient non-AP MLD, with which the recipient TDLS peer STA operating at the other end of the TDLS direct link is affiliated, about the impending TDLS transmission by the initiating non-AP MLD. This notification can help the recipient non-AP MLD to manage its communication (e.g. start/end time alignment considering the impending TDLS transmission) with the AP MLD should there be any NSTR constraints at the recipient non-AP MLD as well. According to one embodiment, the AP MLD can send the TDLS Transmission Notification frame 500 to notify the non-AP MLD for this purpose. According to other embodiments, the AP MLD can use a different frame to send this notification.

According to one embodiment, after transmission of the TDLS Transmission Notification frame 500 by the non-AP MLD, the TDLS peer STA affiliated with the non-AP MLD can immediately start the TDLS transmission over the TDLS direct link. Alternatively, after transmission of the TDLS Transmission Notification frame 500 by the non-AP MLD, the TDLS peer STA affiliated with the non-AP MLD waits until the time indicated in the Time Till Transmission subfield 520 has elapsed before it starts the transmission over the TDLS direct link.

According to another embodiment, after transmission of the TDLS Transmission Notification frame 500 by the non-AP MLD, the TDLS peer STA affiliated with the non-AP MLD can start transmitting over the TDLS direct link after the non-AP MLD, over any link, receives the TDLS Transmission Acknowledgement frame 600 from the AP MLD. Alternatively, after transmission of the TDLS Transmission Notification frame 500 by the non-AP MLD, the TDLS peer STA affiliated with the non-AP MLD can start transmitting over the TDLS direct link either after the non-AP MLD, over any link, receives the TDLS Transmission Acknowledgement frame 600 from the AP MLD, or after the time indicated in the Time Till Transmission subfield 520 in the TDLS Transmission Notification frame 500 sent by the non-AP MLD has elapsed, whichever event happens first.

Referring again to FIG. 3A, according to one embodiment, if a TDLS peer STA affiliated with a non-AP MLD forms one or more NSTR link pairs with other STAs affiliated with the same non-AP MLD, then before the TDLS peer STA starts transmitting the first frame within an obtained transmission opportunity (TXOP) over the TDLS direct link, the non-AP MLD, through any enabled link, shall send a TDLS Transmission Notification frame with a Transmission Start-End Indication subfield set to 1 to the AP MLD notifying about the impending transmission over the TDLS direct link by the TDLS peer STA operating on the link identified by the Link ID subfield of the TDLS Transmission Notification frame.

Upon reception of the TDLS Transmission Notification frame, the AP MLD checks if the TDLS transmission over the indicated link causes any NSTR interference with another STA (for example, due to an ongoing transmission). This check for potential NSTR interference can be for interference at the MLD that hosts the TDLS peer STA intending to transmit over the TDLS direct link or it can be for the recipient MLD that hosts the recipient TDLS peer STA operating at the other end of the TDLS direct link.

According to one embodiment, if the AP MLD, upon reception of the TDLS Transmission Notification frame with Transmission Start-End Indication subfield set to 1, deems that the intended TDLS transmission can cause any potential NSTR interference, then the AP MLD may not send a corresponding acknowledgement for the received TDLS Transmission Notification frame to the non-AP MLD.

According to another embodiment, if the non-AP MLD that transmits the TDLS Transmission Notification frame that indicates the impending transmission over the TDLS direct link does not receive a corresponding acknowledgement frame from the AP MLD, then the TDLS peer STA that is indicated in the TDLS Transmission Notification frame with the impending transmission over the TDLS direct link may not start transmission over the TDLS direct link.

According to another embodiment, the AP MLD may send the acknowledgement for the received TDLS Transmission Notification frame indicating the impending TDLS transmission if the AP MLD deems that the transmission over the TDLS direct link does not cause any potential interference either at the transmitting MLD or at the receiving MLD.

Figure 7:
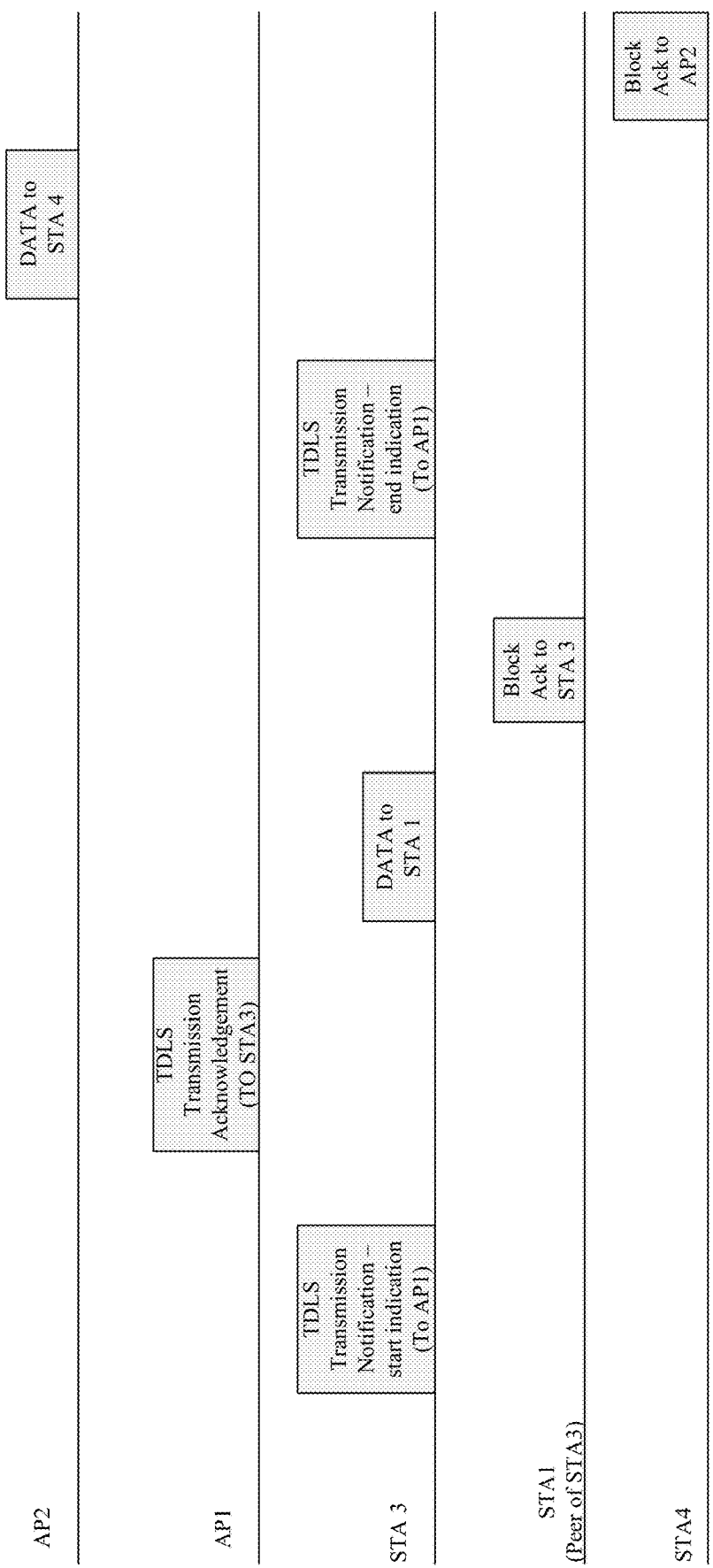
FIG. 7 illustrates an example exchange of a TDLS Transmission Notification frame and a corresponding acknowledgement frame (e.g., a TDLS Transmission Acknowledgement frame) according to various embodiments of the present disclosure.

FIG. 7 illustrates an example exchange of a TDLS Transmission Notification frame and a corresponding acknowledgement frame (e.g., a TDLS Transmission Acknowledgement frame) according to various embodiments of the present disclosure. In this example, AP1, AP2, STA1, STA3, and STA4 correspond to those devices in FIG. 3A. However, it is understood that any suitable devices could be used.

Figure 8:
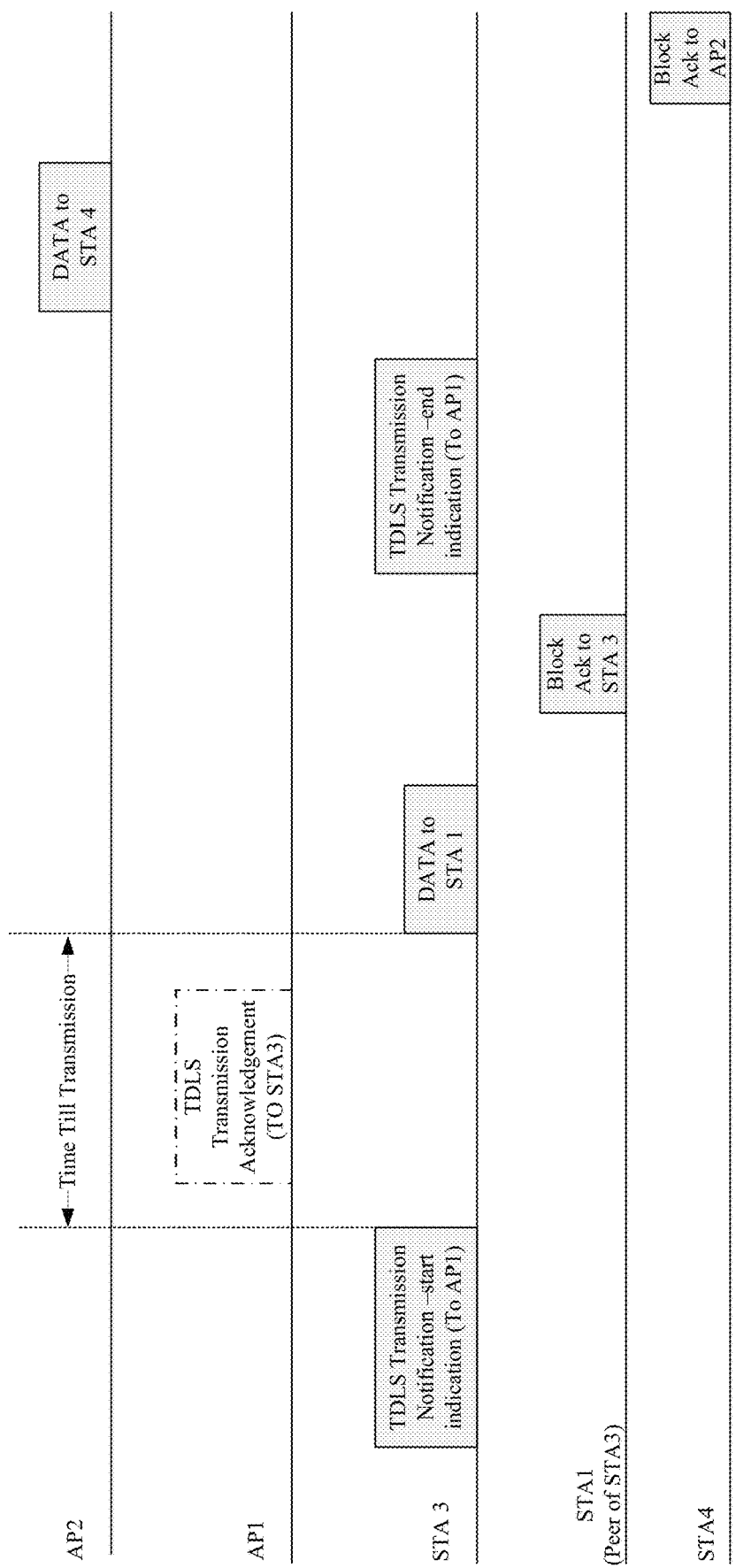
FIG. 8 illustrates an example exchange of a TDLS Transmission Notification frame and a corresponding acknowledgement frame according to an embodiment of the present disclosure.

According to another embodiment, after the TDLS Transmission Notification frame with Transmission Start-End Indication subfield set to 1 is sent to the AP MLD by a non-AP MLD, transmission over the TDLS direct link may start upon expiration of a timer having a pre-defined duration. This pre-defined timer duration can be indicated in the TDLS Transmission Notification frame (e.g., using the Time Till Transmission subfield). FIG. 8 illustrates an example exchange of a TDLS Transmission Notification frame and a corresponding acknowledgement frame according to this embodiment.

According to another embodiment, upon reception of the TDLS Transmission Notification frame with Transmission Start-End Indication subfield set to 1 from a non-AP MLD, the AP MLD may terminate any ongoing transmission to either the transmitting non-AP MLD over any link or to the receiving non-AP MLD at the other end of the TDLS direct link. This termination of any ongoing transmission is done to avoid any potential NSTR interference at either of the non-AP MLDs or for any other reasons.

According to some embodiments, upon terminating any ongoing transmission the AP MLD can send the acknowledgement for the received TDLS Transmission Notification frame with Transmission Start-End Indication subfield set to 1 to the non-AP MLD that transmitted the TDLS Transmission Notification frame.

If the non-AP MLD that hosts the receiving TDLS peer STA at the other end of the TDLS direct link also has NSTR constraints, such that reception over the TDLS direct link may cause NSTR interference with links of the same receiving non-AP MLD, then the AP MLD, upon reception of the TDLS Transmission Notification frame with Transmission Start-End Indication subfield set to 1 from the TDLS transmitting non-AP MLD, can notify the TDLS receiving non-AP MLD so that the TDLS receiving non-AP MLD can terminate any uplink transmission over other links that form NSTR link pairs with the TDLS direct link in order to avoid any potential NSTR interference at the receiving non-AP MLD. The AP MLD can then delay transmitting the acknowledgement for the received TDLS Transmission Notification frame to the TDLS transmitting non-AP MLD until the TDLS receiving non-AP MLD finishes any uplink transmissions over the other links that form NSTR link pairs with the TDLS direct link.

Figure 9:
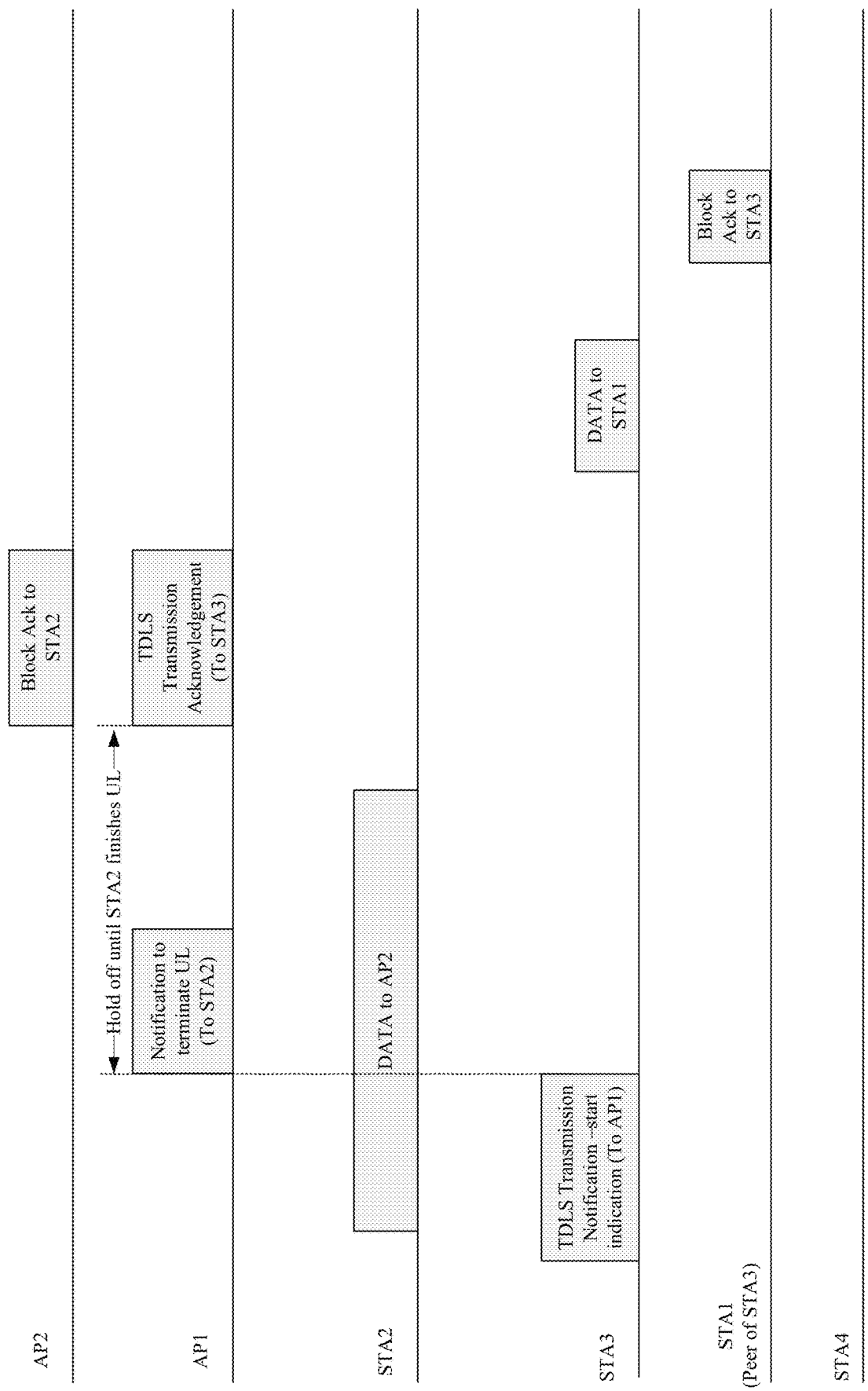
FIG. 9 illustrates an example of the AP MLD delaying transmitting the TDLS Transmission Acknowledgement frame until the receiving non-AP MLD finishes uplink transmissions according to embodiments of the present disclosure.

FIG. 9 illustrates an example of the AP MLD delaying transmitting the TDLS Transmission Acknowledgement frame until the receiving non-AP MLD finishes uplink transmissions according to embodiments of the present disclosure. In the example of FIG. 9, based on the scenario of FIG. 3A, $MLD_S$ is presumed to have NSTR constraints (e.g., STA1 and STA2 form an NSTR link pair). STA3 of $MLD_R$ transmits a TDLS Transmission Notification frame with Transmission Start-End Indication subfield set to 1 to AP1 of $MLD_A$. $MLD_A$ notifies $MLD_S$ to terminate any uplink transmissions from its STAs that form an NSTR link pair, and then waits until $MLD_S$ has terminated its uplink transmission (e.g., from STA3 to AP2) before transmitting a TDLS Transmission Acknowledgement frame to STA3.

Alternatively, if the non-AP MLD that hosts the receiving TDLS peer STA at the other end of the TDLS direct link also has NSTR constraints, such that reception over the TDLS direct link may cause NSTR interference with links of the same receiving non-AP MLD, then the AP MLD, upon reception of the TDLS Transmission Notification frame with Transmission Start-End Indication subfield set to 1 from the TDLS transmitting non-AP MLD, can terminate any downlink transmission over other links that form NSTR link pairs with the TDLS direct link in order to avoid any potential NSTR interference at the receiving non-AP MLD. The AP MLD can then delay transmitting the acknowledgement for the received TDLS Transmission Notification frame to the TDLS transmitting non-AP MLD until the AP MLD finishes any downlink transmissions over the other links that form NSTR link pairs with the TDLS direct link.

Figure 10:
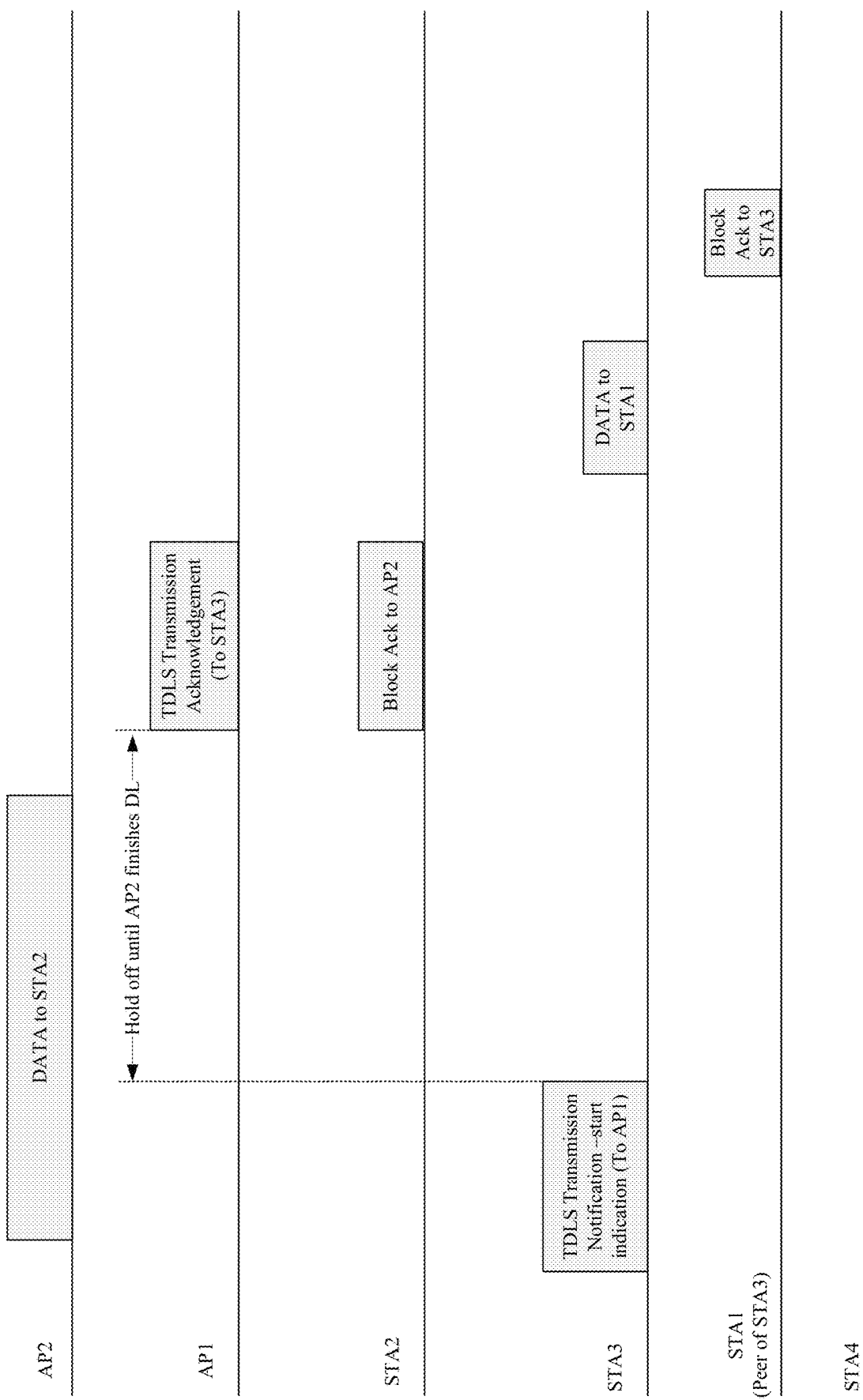
FIG. 10 illustrates an example of the AP MLD delaying transmitting the TDLS Transmission Acknowledgement frame until the AP MLD finishes downlink transmissions according to embodiments of the present disclosure.

FIG. 10 illustrates an example of the AP MLD delaying transmitting the TDLS Transmission Acknowledgement frame until the AP MLD finishes downlink transmissions according to embodiments of the present disclosure. In the example of FIG. 10, based on the scenario of FIG. 3A, $MLD_S$ is presumed to have NSTR constraints (e.g., STA1 and STA2 form an NSTR link pair). STA3 of $MLD_R$ transmits a TDLS Transmission Notification frame with Transmission Start-End Indication subfield set to 1 to AP1 of $MLD_A$. $MLD_A$ begins termination of any of its downlink transmissions to STAs of $MLD_S$ that form an NSTR link pair, and then waits until its downlink transmission (e.g., from AP2 to STA2) is finished before transmitting a TDLS Transmission Acknowledgement frame to STA3.

According to another embodiment, when $MLD_S$ is STR-capable, $MLD_S$ may also send a TDLS Transmission Notification frame with Transmission Start-End Indication subfield set to 1 to the AP MLD notifying about an impending TDLS transmission over the TDLS direct link by STA1 before STA1 starts transmitting over the TDLS direct link to STA3. Upon reception of this notification frame, $MLD_A$ may notify $MLD_R$ to terminate any ongoing UL transmission over Link 2 of $MLD_R$ in order to avoid any potential NSTR interference. According to one embodiment, once $MLD_A$ ensures that transmission over the TDLS direct link by STA1 will not cause any NSTR interference to either $MLD_R$ or $MLD_S$, $MLD_A$ sends the corresponding acknowledgement for the reception of the TDLS Transmission Notification frame with Transmission Start-End Indication subfield set to 1 to $MLD_S$.

According to one embodiment, $MLD_S$ or $MLD_R$ may share their NSTR capability/constraints during the process of TDLS direct link setup between STA1 and STA3. According to one embodiment, these capabilities information can be included in the TDLS Setup Request frame, TDLS Setup Response frame, TDLS Discovery Request frame, TDLS Discovery Response frame, or through other TDLS Action frames.

Figure 11:
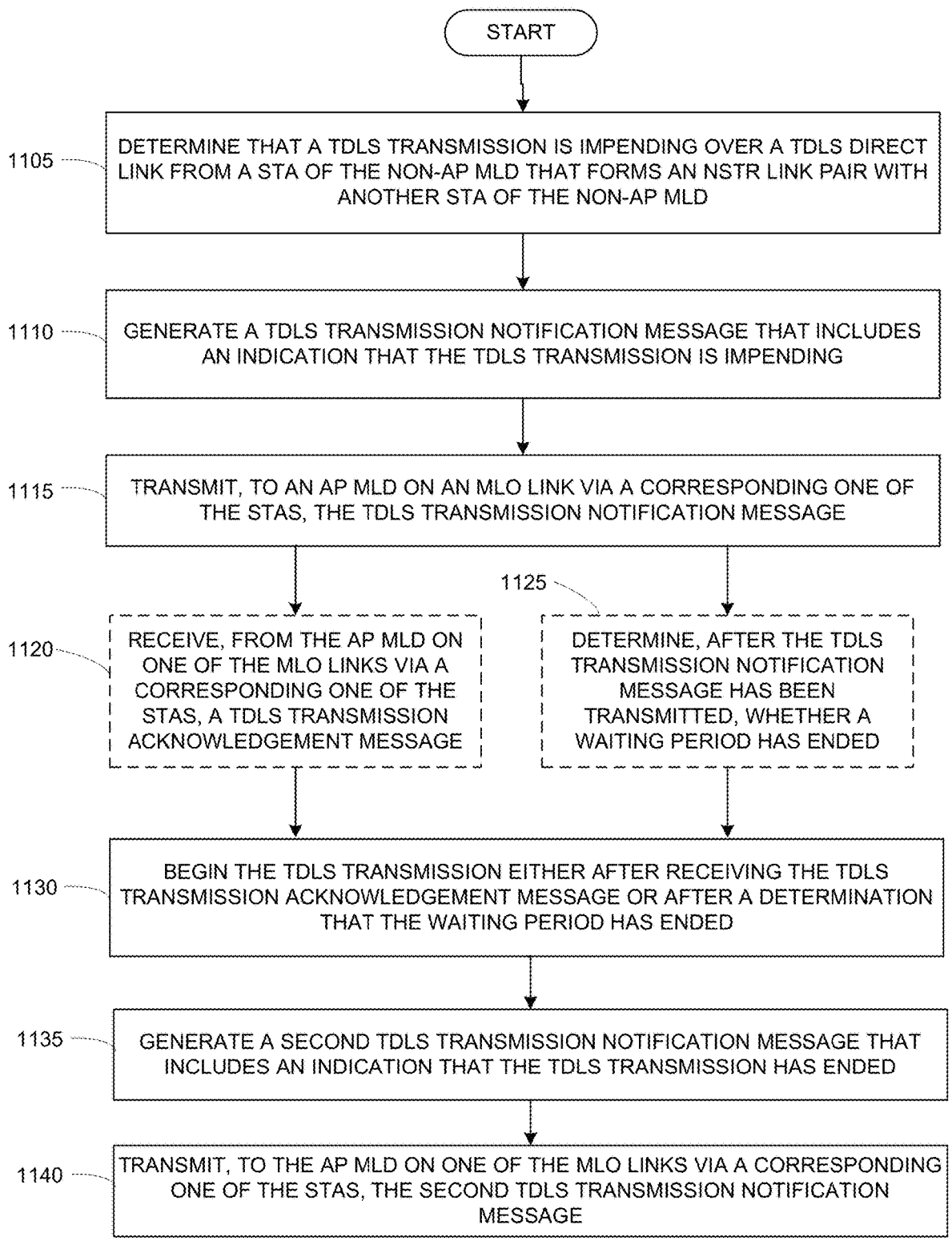
FIG. 11 illustrates an example process for notifying an AP MLD of an impending TDLS transmission between non-AP MLDs in a WLAN according to various embodiments of the present disclosure.

FIG. 11 illustrates an example process for notifying an AP MLD of an impending TDLS transmission between non-AP MLDs in a WLAN according to various embodiments of the present disclosure. The process of FIG. 11 is discussed as being performed by a non-AP MLD, but it is understood that a corresponding AP MLD performs a corresponding process. Additionally, for convenience, the process of FIG. 11 is discussed as being performed by a WI-FI non-AP MLD comprising a plurality of STAs that each comprise a transceiver configured to transmit and receive first signals on MLO links between the STAs and corresponding APs of an AP MLD, respectively, and to transmit or receive second signals on TDLS direct links between the STAs and other peer STAs or corresponding peer STAs of a second non-AP MLD, respectively, wherein at least two of the STAs form a non-simultaneous transmit/receive (NSTR) link pair. However, it is understood that any suitable wireless communication device could perform these processes.

Referring to FIG. 11, the process begins with the non-AP MLD determining that a TDLS transmission is impending over a TDLS direct link from a STA of the non-AP MLD that forms an NSTR link pair with another STA of the non-AP MLD (step 1105).

The non-AP MLD then generates a TDLS transmission notification message that includes an indication that the TDLS transmission is impending (step 1110). In some embodiments the TDLS transmission notification message is generated as a TDLS action frame that includes a TDLS action field, the TDLS action field including the indication that the TDLS transmission is impending. Alternatively, the TDLS transmission notification message may be generated as a control frame or an A-Control subfield that includes the indication that the TDLS transmission is impending.

Next, the non-AP MLD transmits, to an AP MLD on one of the MLO links via a corresponding one of the STAs, the TDLS transmission notification message (step 1115). In some embodiments, based on receipt of the TDLS transmission notification message by the AP MLD, downlink transmissions over the MLO links from the APs of the AP MLD to any of the STAs that form the NSTR link pair are terminated before the impending TDLS transmission begins.

In some embodiments, after step 1115 the non-AP MLD receives, from the AP MLD on one of the MLO links via a corresponding one of the STAs, a TDLS transmission acknowledgement message (step 1120). The TDLS transmission acknowledgement message may be sent by the AP MLD in response to receipt of the TDLS transmission notification message by the AP MLD at step 1120.

In some embodiments, after step 1115 the non-AP MLD determines whether a waiting period has ended (step 1125).

The non-AP MLD begins the TDLS transmission over the one of the TDLS direct links either after receiving the TDLS transmission acknowledgement message at step 1120 or after a determination that the waiting period has ended at step 1125 (step 1130). In some embodiments the non-AP MLD may begin the TDLS transmission after whichever of these events occurs first. In other embodiments the non-AP MLD may only begin transmission after reception of the TDLS transmission acknowledgement message at step 1120. In some embodiments, a power saving mode may be established in the STAs that form an NSTR link pair with the transmitting STA (i.e., the STA that will transmit the impending TDLS transmission). This can include, e.g., a TWT schedule, a WNM power saving mode, a U-APSD mode, etc., wherein a power saving period is scheduled during which the STAs become inactive. In such embodiments, the non-AP MLD may begin the TDLS transmission over the one of the TDLS direct links only when the other STAs that form the NSTR link pair with the transmitting STA have entered a power saving period according to the power saving mode.

Next, the non-AP MLD generates a second TDLS transmission notification message that includes an indication that the TDLS transmission has ended (step 1135).

Finally, the non-AP MLD transmits, to the AP MLD on one of the MLO links via a corresponding one of the STAs, the second TDLS transmission notification message (step 1140).

The above flowchart illustrates an example method that can be implemented in accordance with the principles of the present disclosure and various changes could be made to the method illustrated in the flowchart. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A non-access point (AP) multi-link device (MLD) comprising:
    a plurality of first stations (STAs) that each comprise a transceiver configured to:
        transmit or receive first signals on multi-link operation (MLO) links between the first STAs and corresponding APs of an AP MLD, respectively, and
        transmit or receive second signals on tunneled direct link setup (TDLS) direct links between the first STAs and other peer STAs or corresponding peer STAs of a second non-AP MLD, respectively,
        wherein at least two of the first STAs form a non-simultaneous transmit/receive (NSTR) link pair; and
    a processor operably coupled to the transceivers, the processor configured to:
        determine that a TDLS transmission is impending over one of the TDLS direct links from one of the first STAs that forms the NSTR link pair, and
        generate a TDLS transmission notification message that includes an indication that the TDLS transmission is impending,
    wherein one or more of the transceivers are further configured to transmit, to the AP MLD on one of the MLO links via a corresponding one of the first STAs, the TDLS transmission notification message.

2. The non-AP MLD of claim 1, wherein:
    a power saving period is established for other first STAs that form the NSTR link pair with the first STA from which the TDLS transmission is impending, such that the other first STAs are scheduled to be inactive during the power saving period, and
    one or more of the transceivers are further configured to begin the TDLS transmission over the one of the TDLS direct links after the other first STAs enter the power saving period.

3. The non-AP MLD of claim 1, wherein:
    the processor is further configured to generate a second TDLS transmission notification message that includes an indication that the TDLS transmission has ended, and
    one or more of the transceivers are further configured to transmit, to the AP MLD on one of the MLO links via a corresponding one of the first STAs, the second TDLS transmission notification message.

4. The non-AP MLD of claim 1, wherein one or more of the transceivers are further configured to receive, from the AP MLD on one of the MLO links via a corresponding one of the first STAs, a TDLS transmission acknowledgement message in response to receipt of the TDLS transmission notification message by the AP MLD.

5. The non-AP MLD of claim 4, wherein one or more of the transceivers are further configured to begin the TDLS transmission over the one of the TDLS direct links after receiving the TDLS transmission acknowledgement message.

6. The non-AP MLD of claim 1, wherein:
    the processor is further configured to determine, after the TDLS transmission notification message has been transmitted, whether a waiting period has ended, and
    one or more of the transceivers are further configured to begin the TDLS transmission over the one of the TDLS direct links either after receiving a TDLS transmission acknowledgement message or after a determination that the waiting period has ended.

7. The non-AP MLD of claim 1, wherein the processor is configured to:
    generate the TDLS transmission notification message as a TDLS action frame that includes a TDLS action field, the TDLS action field including the indication that the TDLS transmission is impending; or
    generate the TDLS transmission notification message as a control frame that includes the indication that the TDLS transmission is impending; or generate the TDLS transmission notification message as an A-Control subfield that includes the indication that the TDLS transmission is impending.

8. An access point (AP) multi-link device (MLD) comprising:
a plurality of APs that each comprise a transceiver configured to transmit or receive signals on multi-link operation (MLO) links between the APs and corresponding first stations (STAs) of a first non-AP MLD and STAs of a second non-AP MLD, respectively,
wherein a tunneled direct link setup (TDLS) direct link is formed between a first STA of the first non-AP MLD and another peer STA or corresponding peer STA of the second non-AP MLD,
wherein at least two of the first STAs of the first non-AP MLD form a non-simultaneous transmit/receive (NSTR) link pair, and
wherein the transceivers are further configured to receive, from the non-AP MLD on one of the MLO links via a corresponding one of the APs, a TDLS transmission notification message that includes an indication that a TDLS transmission is impending over the TDLS direct link from one of the first STAs of the first non-AP MLD that forms the NSTR link pair,
the AP MLD further comprising a processor operably coupled to the transceivers, the processor configured to determine, based on the TDLS transmission notification message, that the TDLS transmission is impending over the TDLS direct link from the one of the first STAs of the first non-AP MLD that forms the NSTR link pair.

9. The AP MLD of claim 8, wherein the transceivers are further configured to terminate, based on receipt of the TDLS transmission notification message from the non-AP MLD, downlink transmissions over the MLO links from the APs of the AP MLD to any of the first STAs that form the NSTR link pair before the impending TDLS transmission begins.

10. The AP MLD of claim 8, wherein the transceivers are further configured to receive, from the non-AP MLD on one of the MLO links via a corresponding one of the APs, a second TDLS transmission notification message that includes an indication that the TDLS transmission has ended.

11. The AP MLD of claim 8, wherein:
the processor is further configured to generate a TDLS transmission acknowledgement message in response to receipt of the TDLS transmission notification message from the non-AP MLD, and
one or more of the transceivers are further configured to transmit, to the non-AP MLD on one of the MLO links via a corresponding one of the APs, the TDLS transmission acknowledgement message.

12. The AP MLD of claim 11, wherein the TDLS transmission over the TDLS direct link begins after receipt of the TDLS transmission acknowledgement message by the non-AP MLD.

13. The AP MLD of claim 11, wherein the TDLS transmission over the TDLS direct link begins either after receipt of the TDLS transmission acknowledgement message by the non-AP MLD or after a determination that a waiting period has ended.

14. The AP MLD of claim 8, wherein:
the TDLS transmission notification message is a TDLS action frame that includes a TDLS action field, the TDLS action field including the indication that the TDLS transmission is impending, or
the TDLS transmission notification message is a control frame that includes the indication that the TDLS transmission is impending, or
the TDLS transmission notification message is an A-Control subfield that includes the indication that the TDLS transmission is impending.

15. A method of wireless communication performed by a non-access point (AP) multi-link device (MLD), the method comprising:
determining that a tunneled direct link setup (TDLS) transmission is impending over a TDLS direct link from a first STA of the non-AP MLD that forms a non-simultaneous transmit/receive (NSTR) link pair with another first STA of the non-AP MLD, wherein the TDLS direct link is formed between the first STA of the non-AP MLD and another peer STA or corresponding peer STA of a second non-AP MLD;
generating a TDLS transmission notification message that includes an indication that the TDLS transmission is impending; and
transmitting, to an AP MLD on a multi-link operation (MLO) link via a corresponding one of the first STAs, the TDLS transmission notification message, wherein MLO links are formed between APs of the AP MLD and corresponding first STAs of the non-AP MLD.

16. The method of claim 15, wherein:
a power saving period is established for other first STAs that form the NSTR link pair with the first STA from which the TDLS transmission is impending, such that the other first STAs are scheduled to be inactive during the power saving period, and
the method further comprises beginning the TDLS transmission over the one of the TDLS direct links after the other first STAs enter the power saving period.

17. The method of claim 15, further comprising:
generating a second TDLS transmission notification message that includes an indication that the TDLS transmission has ended; and
transmitting, to the AP MLD on one of the MLO links via a corresponding one of the STAs, the second TDLS transmission notification message.

18. The method of claim 15, further comprising receiving, from the AP MLD on one of the MLO links via a corresponding one of the STAs, a TDLS transmission acknowledgement message in response to receipt of the TDLS transmission notification message by the AP MLD.

19. The method of claim 15, further comprising:
determining, after the TDLS transmission notification message has been transmitted, whether a waiting period has ended; and
beginning the TDLS transmission over the one of the TDLS direct links either after receiving a TDLS transmission acknowledgement message or after a determination that the waiting period has ended.

20. The method of claim 15, wherein:
the TDLS transmission notification message is generated as a TDLS action frame that includes a TDLS action field, the TDLS action field including the indication that the TDLS transmission is impending, or
the TDLS transmission notification message is generated as a control frame that includes the indication that the TDLS transmission is impending, or
the TDLS transmission notification message is generated as an A-Control subfield that includes the indication that the TDLS transmission is impending.

* * * * *